United States Patent
Sun et al.

(10) Patent No.: US 12,066,390 B2
(45) Date of Patent: Aug. 20, 2024

(54) ESTIMATING BACKGROUND RADIATION FROM UNKNOWN SOURCES

(71) Applicant: Varex Imaging Corporation, Salt Lake City, UT (US)

(72) Inventors: Mingshan Sun, Menlo Park, CA (US); Josh Star-Lack, Palo Alto, CA (US); Kevin Holt, Chicago, IL (US)

(73) Assignee: Varex Imaging Corporation, Salt Lake City, UT (US)

(*) Notice: Subject to any disclaimer, the term of this patent is extended or adjusted under 35 U.S.C. 154(b) by 0 days.

(21) Appl. No.: 17/394,253

(22) Filed: Aug. 4, 2021

(65) Prior Publication Data
US 2022/0042932 A1 Feb. 10, 2022

Related U.S. Application Data

(60) Provisional application No. 63/060,988, filed on Aug. 4, 2020.

(51) Int. Cl.
*G01N 23/046* (2018.01)
*G01T 1/29* (2006.01)

(52) U.S. Cl.
CPC ......... *G01N 23/046* (2013.01); *G01T 1/2921* (2013.01); *G01N 2223/419* (2013.01)

(58) Field of Classification Search
CPC ............ G01N 23/046; G01N 2223/419; G01T 1/2921; G01T 1/2985; G01T 1/1647
See application file for complete search history.

(56) References Cited

U.S. PATENT DOCUMENTS

| | | | |
|---|---|---|---|
| 2007/0086561 A1* | 4/2007 | Bruder | A61B 6/032 378/7 |
| 2011/0255655 A1 | 10/2011 | Star-Lack et al. | |
| 2016/0213345 A1 | 7/2016 | Star-Lack et al. | |
| 2018/0325485 A1 | 11/2018 | Maslowski et al. | |
| 2019/0197740 A1 | 6/2019 | Lu et al. | |
| 2020/0170592 A1* | 6/2020 | Bai | G06T 11/005 |
| 2020/0273214 A1* | 8/2020 | Xu | G06N 3/08 |

OTHER PUBLICATIONS

PCT/US2021/044542, International Search Report dated Nov. 19, 2021.
PCT/US2021/044542, Written Opinion dated Nov. 19, 2021.
(Continued)

*Primary Examiner* — David P Porta
*Assistant Examiner* — Gisselle M Gutierrez
(74) *Attorney, Agent, or Firm* — Laurence & Phillips IP Law

(57) ABSTRACT

Embodiments include a method, comprising: receiving measured radiation obtained from a radiation detector that received radiation through an object; simulating the measured radiation obtained from the radiation detector that received radiation through the object; generating an offset based on the measured radiation and the simulated measured radiation; estimating scatter radiation based on the offset; and estimating primary radiation based on the estimated scatter radiation.

20 Claims, 20 Drawing Sheets

(56) References Cited

OTHER PUBLICATIONS

Horvath Aron Et Al: "Analysis of primary modulation based x-ray scatter correction methods", Medical Physics, AIP, Melville, NY, US, vol. 43, No. 11, Oct. 5, 2016 (Oct. 5, 2016), pp. 5794-5807, XP012212573, ISSN: 0094-2405, DOI: 10.1118/1.4963209 [retrieved on Oct. 5, 2016].
Sun Mingshan et al: "Correction for patient table-induced scattered radiation in cone-beam computed tomography (CBCT)", Medical Physics, AIP, Melville, NY, US, vol. 38, No. 4, Mar. 22, 2011 (Mar. 22, 2011), pp. 2058-2073, XP012145199, ISSN: 0094-2405, DOI: 10.1118/1.3557468.
Extended European Search Report / Opinion : EP 21 18 9657 of Apr. 1, 2022.

* cited by examiner

ESTIMATING BACKGROUND RADIATION FROM UNKNOWN SOURCES

BACKGROUND

Unless otherwise indicated herein, the approaches described in this section are not prior art to the claims in this disclosure and are not admitted to be prior art by inclusion in this section.

Some x-ray imaging may use a wide area cone shaped beam. An x-ray detector may detect both principal radiation and scattered radiation. The scattered radiation may introduce artifacts into the image or reconstruction.

DETAILED DESCRIPTION OF SOME EXAMPLE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Numbers provided in flow charts and processes are provided for clarity in illustrating steps and operations and do not necessarily indicate a particular order or sequence. Unless otherwise defined, the term "or" can refer to a choice of alternatives (e.g., a disjunction operator, or an exclusive or) or a combination of the alternatives (e.g., a conjunction operator, and/or, a logical or, or a Boolean OR).

Disclosed embodiments relate generally to technology, mechanisms, methods, devices, and systems, referred to generally as technology, to estimate background scatter radiation or an offset from unknown sources along with object scatter and correct for both the scatter radiation generated by an object in a field-of-view (FOV) of an imaging detector, background scatter radiation outside the FOV of the imaging detector, or the like. Disclosed embodiments also provide technology for estimating a spatially variant and/or invariant scaling factor (gain) for the object scatter and a spatially variant and/or invariant offset for background scatter radiation.

Figure 1:
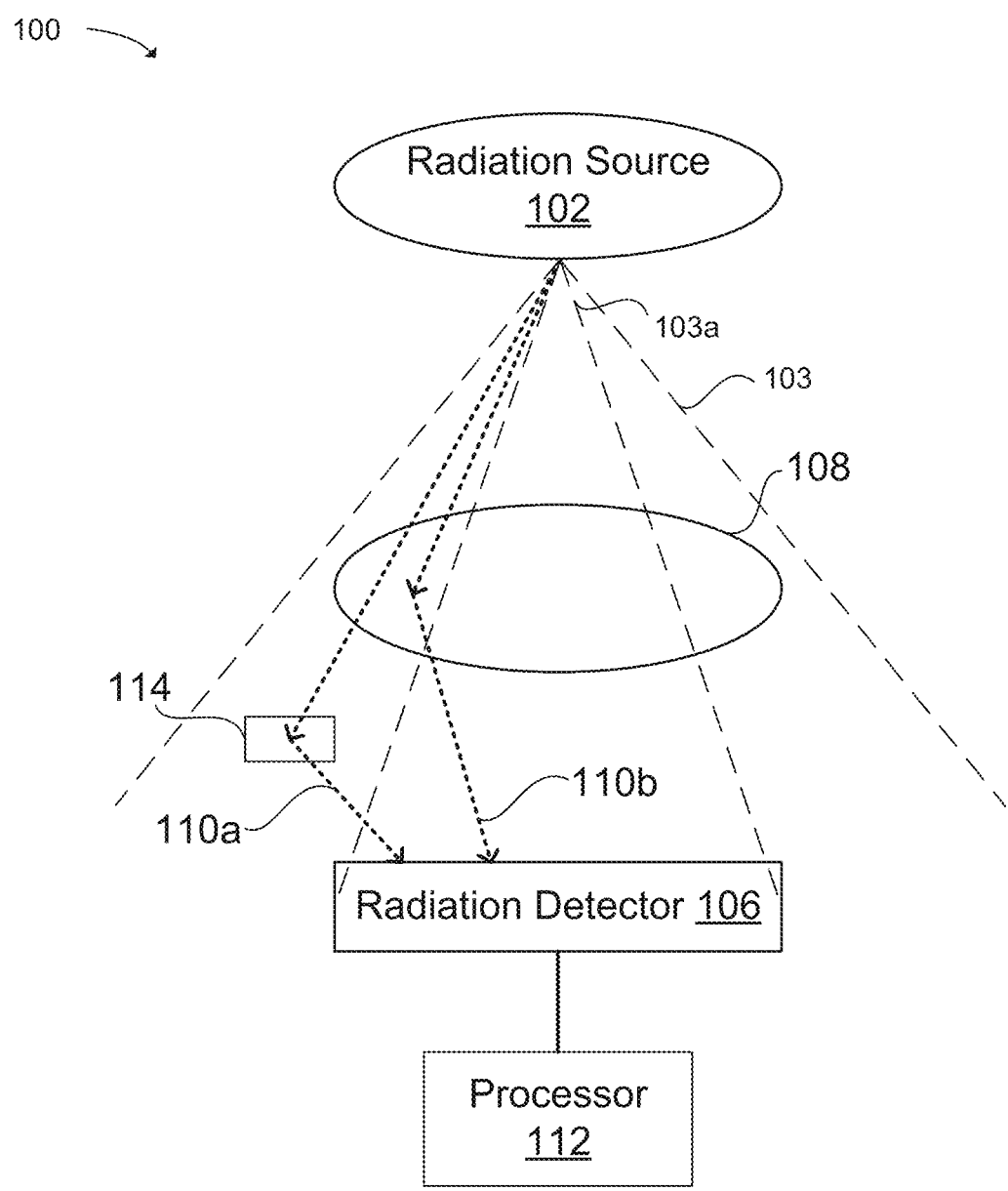
FIG. 1 is a block diagram of an imaging system according to some embodiments.

FIG. 1 is a block diagram of an imaging system according to some embodiments. Cone-beam computed tomography (CBCT) is an imaging technique for providing three dimensional (3D or 3-D) volumetric information of an object. An imaging system 100 typically consists of a radiation source 102, such as an x-ray source, and a radiation detector 106, also referred to as flat-panel detector, imaging detector, or detector. Using an x-ray source as an example, the radiation source 102 is configured to emit a divergent cone of x-ray radiation 103 which produces a signal on the radiation detector 106 after passing through the object 108 generating a projection image. By rotating (e.g., via gantry) the system 100 fully or partially around the object 108 or equivalently by rotating the object 108 within a fixed stationary imaging system 100, then applying an appropriate reconstruction algorithm, a 3D reconstruction of the internal structures of the object 108 can be obtained. Although rotation is used as an example, in other embodiments, different acquisition trajectories or techniques may be used such as helical, circle+line, saddle, tomosynthesis, laminography, "inverse-geometry CT", or the like. Because of the CBCT's high, isotropic spatial resolution and high throughput, CBCT is a powerful tool for industrial applications like dimensional metrology, non-destructive testing, defect identification, general quality control, and parts inspection on an assembly line. CBCT is also a powerful tool for other applications such as medical imaging and security inspection.

The wide-area cone-shaped beam 103 may generate a large amount of scattered radiation when it passes through a material, causing undesirable and sometimes severe image quality degradation producing artifacts, such as cupping, shading, streaks, inhomogeneities, and inaccuracies in material densities, and the like.

The system 100 may be coupled to a processor 112. The processor 112 may be a general purpose processor, a digital signal processor (DSP), a graphics processing unit (GPU), an application specific integrated circuit, a microcontroller, a programmable logic device, discrete circuits, a combination of such devices, or the like. Although only one processor 112 is illustrated in system 100, multiple processors 112 may be present. In addition, other interface devices, such as memory, logic chipsets, hubs, memory controllers, communication interfaces, or the like may be part of the processor 112.

The processor 112 may be configured to perform various image processing techniques on one or more images received from the image detector 106. Some image processing techniques may mitigate the scatter problem, particularly addressing the scatter which arises from the object itself. For example, a kernel-based scatter estimation method may be fast and efficient but may have some modest accuracies. In another example, CBCT scatter-correction algorithm uses a fast finite-element deterministic photon transport solver that runs on a GPU. The fast finite-element deterministic photon transport solver may quickly calculate the non-scattered (primary) and scattered x-ray photons that are transported through a 3D voxelated representation of the object, which is often generated from a processed first-pass CBCT reconstruction. The estimated or calculated scatter from either the kernel method or the transport-based method, which approximates the actual scatter, can then be subtracted from the measured original projections to reconstruct more accurate images.

Because virtually anything that is in the path of the x-ray beam can generate scatter, more scattering sources may exist than just those in the object 108. If the x-ray beam is wide open, for example, as is the case for some industrial applications, any additional object 114 that is not in the field-of-view 103a (FOV) of the radiation detector 106 but is in the irradiation field 103 can also generate scattered radiation 110a that reaches the detector. Depending on the particular setup of the scanning system and the location of the additional objects 114, this scatter (or "background") component can be significant. But unfortunately, because this type of scattering source is not seen by the radiation detector 106, the intensity of this background scatter can be practically impossible for any of the conventional software-based scatter estimation/correction algorithms to address and correct, including the above mentioned two methods and many others in the literature.

Correcting for background radiation is a general problem in industrial CBCT because typically the beam is not collimated. Some embodiments described herein may heuristically solve the problem of estimating scatter from unknown sources outside of the radiation detector FOV 103a.

In x-ray imaging, the signal reaching the detector has two components, primary and scatter as represented by Expression 1:

$$I_m = I_p + I_s \quad \text{Expression 1}$$

$I_m$ is the (measured) signal reaching the detector, $I_p$ is the primary, and $I_s$ is the scatter. The primary $I_p$ represents un-scattered photons, whose spatial distribution carries information about the internal structures of the object 108 and is considered the "true" signal. $I_m$ is what is measured. A scatter correction technique or algorithm is performed to obtain the unknown $I_p$ from the known $I_m$.

In some embodiments, scatter L and primary $I_p$ radiation are calculated from a first pass reconstruction of a given object using the underlying physics laws that describe radiation transport. This computation or process is referred to as simulation. The simulation starts with a spectrum of the x-ray source, models the cone-shaped irradiation, attenuates the modeled irradiation by a 3D matrix of materials whose composition and densities resemble the object, and computes the primary and scatter intensities separately. The simulated signal is represented by Expression 2:

$$J_{tot} = J_p + J_s \quad \text{Expression 2}$$

$J_p$ is the simulated primary radiation, $J_s$ the simulated scatter radiation, and $J_{tot}$ the combined simulated measured radiation.

When the various components are modeled correctly including the x-ray spectrum, source distribution, scanner geometry, object properties, such as the material composition and density, and the detector response, then the simulated measured radiation $J_{tot}$, should be a close match to the measured radiation $I_m$. Differences between the simulated measured radiation $J_{tot}$ and the measured radiation $I_m$, should include a gain or scaling constant and noise. The gain arises from the fact that the number of photons represented in the simulation does not necessary represent the measurement (e.g., the difference may be due to a variety of unmodeled effects such as analog-to-digital converter (ADC) scaling, electronic gain, detector capacitor selection, tube current setting (e.g., mA setting), tube filtration, or inaccurate source to distance measurements). Let the gain be represented as λ, and initially ignoring noise sources such as photon noise and electronic noise (which is discussed later), then the relationship between the simulated measured radiation $J_{tot}$ and the measured radiation $I_m$ can be represented by Expression 3:

$$\begin{cases} I_p = \lambda J_p \\ I_s = \lambda J_s \\ I_m = \lambda J_{tot} \end{cases} \quad \text{Expression 3}$$

Combining Expressions 1 and 3, the primary radiation $I_p$ can be represented by Expression 4:

$$I_p = I_m - \lambda J_s \quad \text{Expression 4}$$

The CBCT scatter-correction method does not directly take $\lambda J_p$ as the $I_p$ because the primary is typically a high frequency signal which is difficult to model based on a rough first pass reconstruction. Because scatter is a low frequency signal, the calculation of which is generally robust to errors in the first pass reconstruction, subtracting a scatter estimate from the measured signal results in a more accurate primary signal $I_p$ than simulating the primary itself directly.

The scaling factor 21 can be inferred from two known quantities, $I_m$ and $J_{tot}$, as the direct ratio of the two as represented by Expression 5:

$$\lambda = I_m / J_{tot} \quad \text{Expression 5}$$

$J_{tot}$ and $I_m$ are images (or matrices in the mathematical terms). In some embodiments, λ is a scalar that applies to all pixels where the value of λ that is generated is one that it may be a good compromise for every pixel. For example, the value of λ can be obtained by averaging, which can be done before calculating Expression 5 (e.g., averaging the pixel values in $I_m$ and $J_{tot}$, then generating scaling factor λ from the ratio of the averages of $I_m$ and $J_{tot}$ (λ=$I_{m,AVG}$/$J_{tot,AVG}$)) or after calculating Expression 5 (e.g., calculating the ratio of the values for each pixel in $I_m$ and $J_{tot}$, then generating scaling factor λ from the average of the ratios (λ=(average of ($I_m$/$J_{tot}$)))). Stated another way, one approach is to calculate Expression 5 for each pixel, then aggregate the results by taking the average of those ratios to get λ. Another approach is to first aggregate the pixel values by taking an average of $J_{tot}$ pixels and an average of $I_m$ pixels, then apply Expression 5 to get λ. As another, λ can be taken as a weighted average instead of a simple average, giving less weight to noisier or less trusted data points. As yet another example, λ can be calculated by a median instead of an average.

Note that the simulated measured radiation $J_{tot}$ may differ from the measured radiation $I_m$ aside from what is described by the gain λ. In other words, the simulated measured radiation $J_{tot}$ may not resemble what's been measured by the radiation detector 106 as the measured radiation $I_m$. Many reasons may exist for this discrepancy including any assumptions in the simulation that deviate from the physical reality. For example, the energy spectrum of the x-ray source, the accuracy of the object 108 model's material and density estimates, and the detector's response to x-ray incidence, can be very difficult to model perfectly. Although the errors in the simulation model can be sources of error, these errors are typically small relative to an added external scatter component from sources other than the object that is being imaged.

Not factoring the added external scatter component into the simulation model can be problematic because the scaling relationship between the measurement and the simulation no longer holds. The disclosed method without background compensation works if the object is part of the model. If unknown objects 114 exist outside of FOV 103a, and these unknown objects 114 are not accounted for, then the image processing without background compensation can significantly underestimate scatter.

In cases when objects in the vicinity of the detector are irradiated but do not produce a direct image (primary) on the detector but contribute scatter to the image, this signal is referred to herein as "background scatter" or "external scatter." Expression 3 can be rewritten, enhanced, and/or expanded to include the background component, which can be represented by Expression 6:

$$\begin{cases} I_p = \lambda J_p \\ I_s = \lambda J_s + b \\ I_m = \lambda J_{tot} + b \end{cases} \quad \text{Expression 6}$$

where the additional variable b represents background scatter and is an unknown.

Embodiments described herein may use the information from $I_m$ and $J_{tot}$ estimate λ and b. Note that each of λ and b may be spatially-varying (matrices) or spatially-constant (scalars). Embodiments may include several algorithms including a first algorithm where the gain λ is a scalar and the offset b is a matrix, a second algorithm where the gain λ is a scalar and the offset b is a scalar, and a third algorithm with a framework for supporting spatial variations in both the gain λ and the offset b. Other embodiments may include different algorithms. In some embodiments, the gain λ associated with $J_{tot}$, $J_p$ and $J_s$ may be the same or different.

As used herein the offset b is interchangeably referred to as "external scatter", "background", "additional scatter", or "offset". And λ is referred to as the "scaling factor" or the "gain".

Figure 2A:
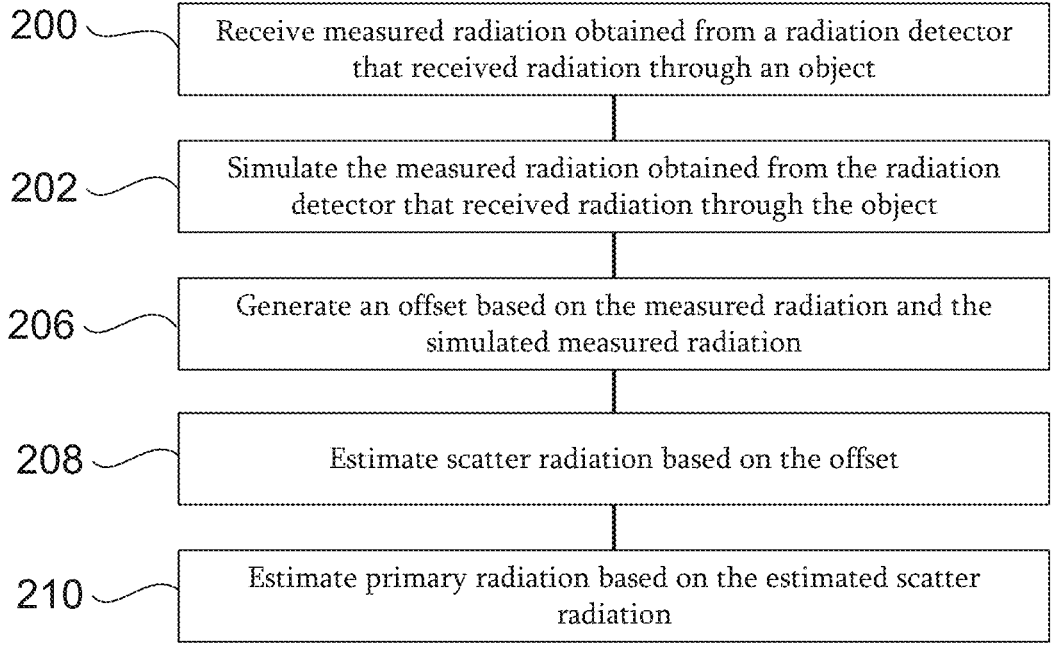
FIGS. 2A-2B are flowcharts of image processing techniques with scatter correction according to some embodiments.
Figure 2B:
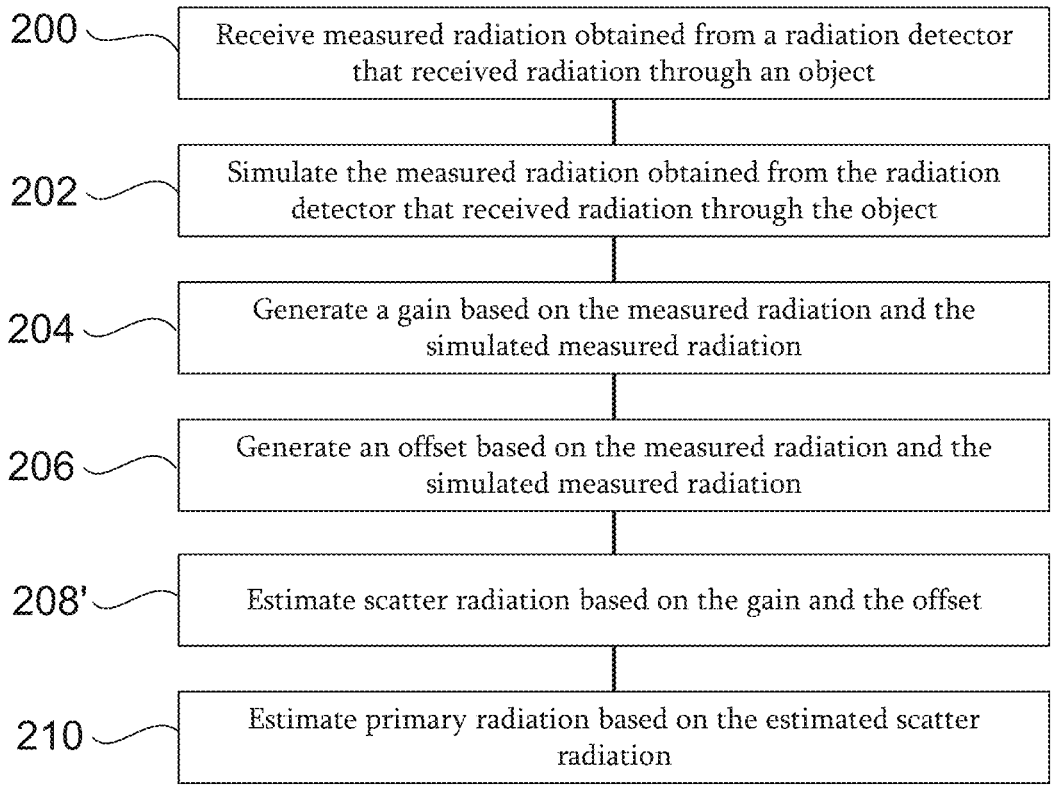

FIGS. 2A-2B are flowcharts of image processing techniques with scatter correction according to some embodiments. The system 100 of FIG. 1 will be used as an example. The processor 112 of FIG. 1 may be configured to perform the various techniques described herein; however, in other embodiments, the processor 112 may be configured to perform some of the operations while other operations are performed by other processors. Referring to FIGS. 1, 2A, and 2B, in some embodiments, in 200, measured radiation $I_m$ obtained from a radiation detector 106 that received radiation 103 through an object 108 is received. The processor 112 may generate a two-dimensional array of data representing the intensity of the received radiation based on data received from the radiation detector 106. In some embodiments, the radiation detector 106 may be configured to generate the data. In other embodiments, the processor 112 may be configured to receive the measured radiation $I_m$ from a different source.

In 202, the measured radiation $I_m$ obtained from the radiation detector 106 that received radiation through the object 108 is simulated as $J_{tot}$. In some embodiments, the processor 112 performs the simulation while in others, other systems may perform the simulation and provide the result to the processor 112. The simulation may be performed using a variety of photon transport simulation techniques. 3D VSHARP is an example of such a technique; however, in other embodiments, other techniques may be used.

In some embodiments, in 204, a gain λ is generated based on the measured radiation $I_m$ and the simulated measured radiation $J_{tot}$. However, in other embodiments, the generation of the gain may be omitted, assumed to be a constant such as 1, or otherwise not based on the one or both of the measured radiation $I_m$ and the simulated measured radiation $J_{tot}$. In some embodiments, the gain λ may be generated as part of an earlier calibration procedure. A scan with no object 108 may be performed. The gain may be λ may be generated by using measured and simulated data from that scan rather than one when the offset b will be generated. In some embodiments, the gain λ may be generated before data from a desired scan of an object 108 is obtained. In other embodiments, the gain λ may be generated by scaling the gain λ by an appropriate factor based on source-imager-distance, source flux, or the like. In some embodiments, the gain λ may be generated by simulating the components of the system 100 to analytically generate the gain λ.

In 206, an offset b is generated based on the measured radiation $I_m$ and the simulated measured radiation $J_{tot}$. The gain λ and offset b may be generated by the processor 112. As will be described below, a variety of techniques may be used to generate the gain λ and offset b. Each of the gain λ and offset b may be a matrix or a scalar. In the operations 204 and 206, the gain λ and offset b may be generated based on the simulated measured radiation $J_{tot}$ by using a part of the simulated measured radiation $J_{tot}$, such as the simulated primary radiation $J_p$ or the simulated scatter radiation $J_s$.

In 208 or 208', scatter radiation $I_s$ is estimated based on the offset b or the gain λ and the offset b, respectively. In 210, primary radiation $I_p$ is estimated based on the estimated scatter radiation $I_s$. The estimated primary radiation may also be referred to as correcting the primary radiation. Or correcting the measured radiation $I_m$. In some embodiments, once both the gain λ and the offset b are generated, the estimation of scatter radiation $I_s$ can be calculated as the simulated scatter radiation $J_s$ plus the external scatter represented by the offset b as represented by Expression 7:

$$I_s = \lambda J_s + b \qquad \text{Expression 7}$$

For completeness, note that the measured primary radiation or primary radiation $I_p$ is just the difference between the measured radiation $I_m$ and measured scatter radiation $I_s$, but in some embodiments, to reduce noise, the primary radiation $I_p$ is estimated, as represented by Expression 8:

$$I_p = I_m\left(1 - \frac{I_s}{I_m}\right) \qquad \text{Expression 8}$$

In practice, the term that multiplies $I_m$ can then be filtered and/or clipped in order to reduce noise. In other embodiments the measured primary radiation $I_p$ is merely calculated by subtracting the estimation of scatter radiation $I_s$ from the measured radiation $I_m$.

In some embodiments, the calculated offset b may not have the same size as $J_s$ and can be resized to that of $J_s$ if necessary. In some embodiments, $I_s$ may need to be resized again to match the size of $I_m$.

Figure 3:
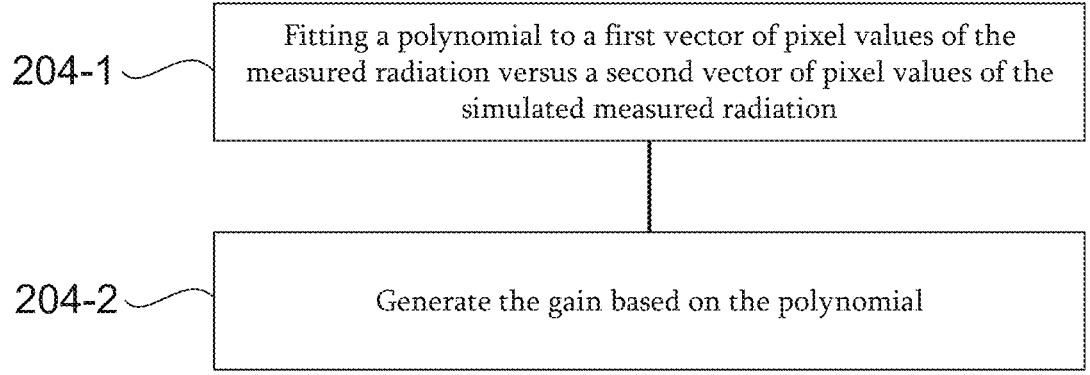
FIG. 3 is a flowchart of gain estimation in an image processing technique with scatter correction according to some embodiments.

FIG. 3 is a flowchart of gain estimation in an image processing technique with scatter correction according to some embodiments. In some embodiments, the gain λ may be estimated based on various operations on the measured radiation and the simulated measured radiation. Operations 204-1 and 204-2 are examples of operations that may be included in operation 204 of FIG. 2B.

In 204-1, a polynomial is fit to a first vector of pixel values of the measured radiation $I_m$ versus a second vector of pixel values of the simulated measured radiation $J_{tot}$. In 204-1, the gain λ is based on the polynomial. For example, the gain λ may be a scalar value that is the linear component of the polynomial.

In some embodiments, the polynomial may be a first order or linear polynomial. However, in other embodiments, the polynomial may be a higher order polynomial. In some embodiments, a polynomial that is at least a second order polynomial may better accommodate errors in the simulation model such as residual beam hardening effects, detector response inaccuracies, or the like. As a result, the linear term may be less affected by the corresponding nonlinearities in the simulation-measurement mapping.

The fit will also produce a 0th order term, which is considered a gross offset (or scalar offset b) for the entire projection. As will be described below, additional operations may be performed to generate the offset b used to estimate the scatter radiation.

Figure 4:
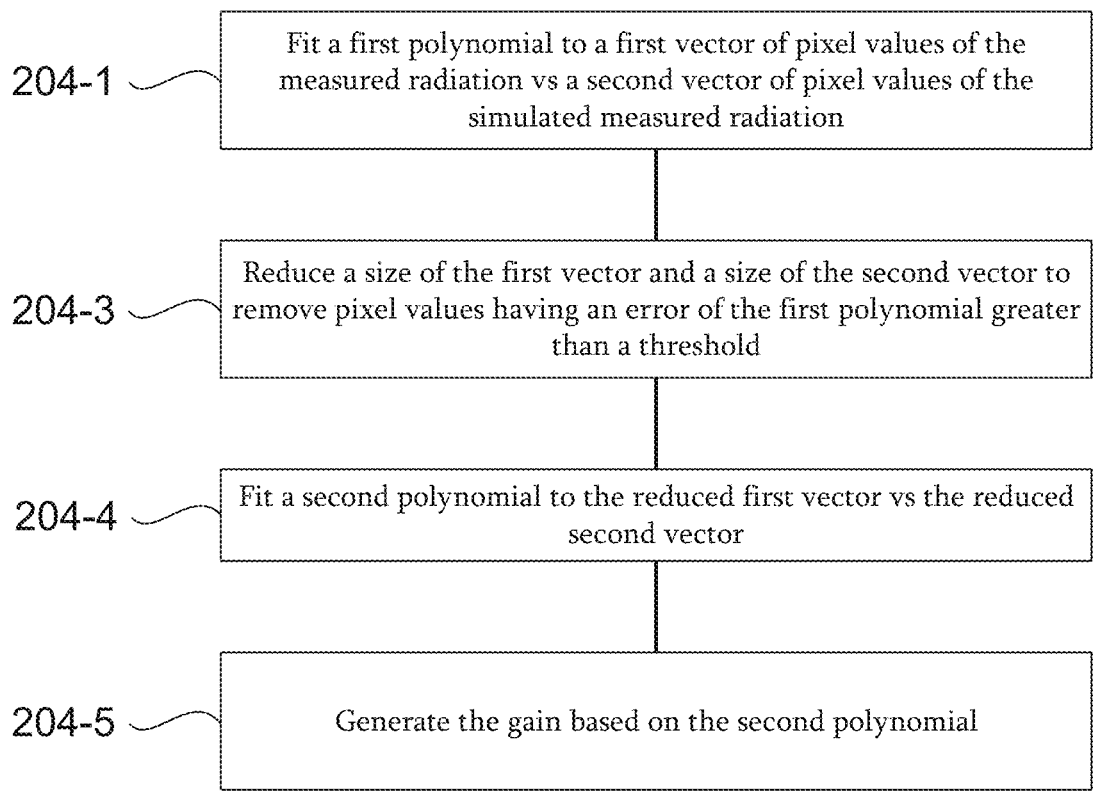
FIG. 4 is a flowchart of multiple-pass gain estimation in an image processing technique with scatter correction according to some embodiments.

FIG. 4 is a flowchart of a multiple-pass gain estimation in an image processing technique with scatter correction according to some other embodiments. The operations 204-1, 204-3, 204-4, and 204-5 are examples of operations that may be included in operation 204 of FIG. 2B.

In 204-1, a first polynomial is fit to a first vector of pixel values of the measured radiation versus a second vector of pixel values of the simulated measured radiation. This operation may be the same as 204-1 of FIG. 3 as described above.

In 204-3, a size of the first vector and a size of the second vector are reduced to remove pixels having an error of the first polynomial greater than a threshold. In some embodiments, the threshold may be infinity or a sufficiently large number. As a result, no pixels will be removed. In other embodiments, the threshold may be set so that outlying pixels are removed. As a result, the first vector and the second vector will have fewer pixels. In a particular example, the threshold for the error may be about 40%-60%. In some embodiments, the threshold is 50%.

In 204-4, a second polynomial is fit to the reduced first vector versus the reduced second vector. The fitting operation may be the same or similar to that in 204-1. If the operations in 204-1 and 204-3 removed pixels that were outliers, i.e., had a higher error relative to the first polynomial, the second polynomial may have a better fit. In some embodiments the operation in 204-4 may use a different order polynomial as the second polynomial.

In 204-5, the gain λ is generated based on the second polynomial. The generation of the gain λ may be the same or similar to that in 204-2 but using the second polynomial.

In some embodiments, operations similar to 204-1 and 204-3 may be repeated to further reduce the pixels of the first vector and the second vector. The same or a different threshold for the error may be used to remove pixels. However, after a number of iterations, a final polynomial may be fit similar to 204-4 and the gain λ generated as in 204-5.

Figure 5:
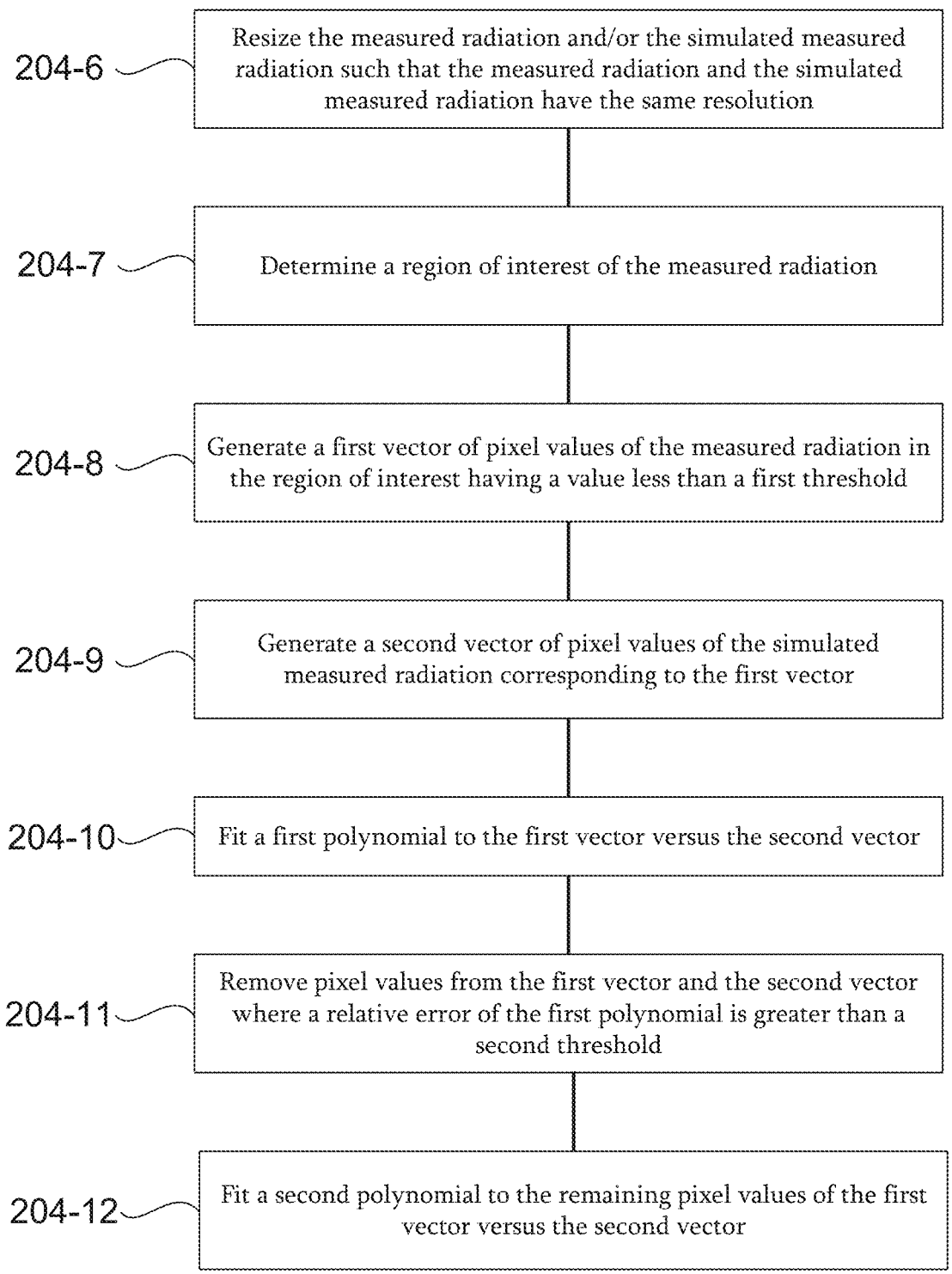
FIG. 5 is a flowchart of multiple-pass gain estimation using a region of interest in an image processing technique with scatter correction according to some embodiments.

FIG. 5 is a flowchart of multiple-pass gain estimation using a region of interest in an image processing technique with scatter correction according to some other embodiments. The operations 204-6 to 204-12 are examples of operations that may be included in operation 204 of FIG. 2B.

In 204-6, the measured radiation $I_m$ and/or the simulated measured radiation $J_{tot}$ are resized such that the measured radiation $I_m$ and the simulated measured radiation $J_{tot}$ have the same resolution. The measured radiation $I_m$ may be resized, the simulated measured radiation $J_{tot}$ may be resized, or both may be resized. After the resizing, the pixels of the measured radiation $I_m$ and the simulated measured radiation $J_{tot}$ may have a one-to-one association.

In 204-7, a region of interest (ROI) of the measured radiation $I_m$ is determined. In some embodiments, the ROI may be the full image while in other embodiments, the ROI may be a subregion of the image. In a particular example, the ROI may be an area where the signal is generally lowest and thus the scatter influence is the largest. The area of the image with the lowest signal may include the area that corresponds to the central region of the object 108 projected onto the radiation detector 106. As another example, there may be several ROIs placed around the volume, either at regular intervals, or at particular features of interest identified by computer vision. In some particular examples, a ROI may be determined by registering the volume against manually identified ROIs on a CAD model the CAD model, automatically searching for a few large broad flat regions, automatically searching for flat areas with some desired path lengths (e.g. longer paths, or medium paths, paths greater than one quarter of the image, or the like), automatically searching for areas with a distribution of different path lengths, finding some edges or corners in the image and analyzing an ROI surrounding the edge or corner, finding the center of mass of a cylinder block or of a circuit board and drawing an ROI around it, placing an ROI over mixed-material regions or between dense objects, or the like.

In 204-8, a first vector of pixel values of the measured radiation in the region of interest having a value less than a first threshold is generated. The first threshold may be selected such that all pixels of the ROI are selected. In other embodiments, the first threshold may be selected such that only pixels with a value less than a particular signal level are selected. These pixel values are gathered into the first vector.

In 204-9, a second vector of pixel values of the simulated measured radiation corresponding to the first vector is generated. As in 204-6, the measured radiation $I_m$ and/or the simulated measured radiation $J_{tot}$ were resized, the second vector of pixel values may be selected corresponding to the first vector of pixel values on a one-to-one basis.

In 204-10, a first polynomial is fit to the first vector versus the second vector. In 204-11, pixel values from the first vector and the second vector are removed where a relative error of the first polynomial is greater than a second threshold. In 204-12, a second polynomial is fit to the remaining pixel values of the first vector versus the second vector. In 204-13, the gain comprises a linear term of the second polynomial. The operations in 204-10 to 204-13 may be similar to the operations 204-1, 204-3, 204-4, and 204-5 as described above with respect to FIG. 4.

Figure 6:
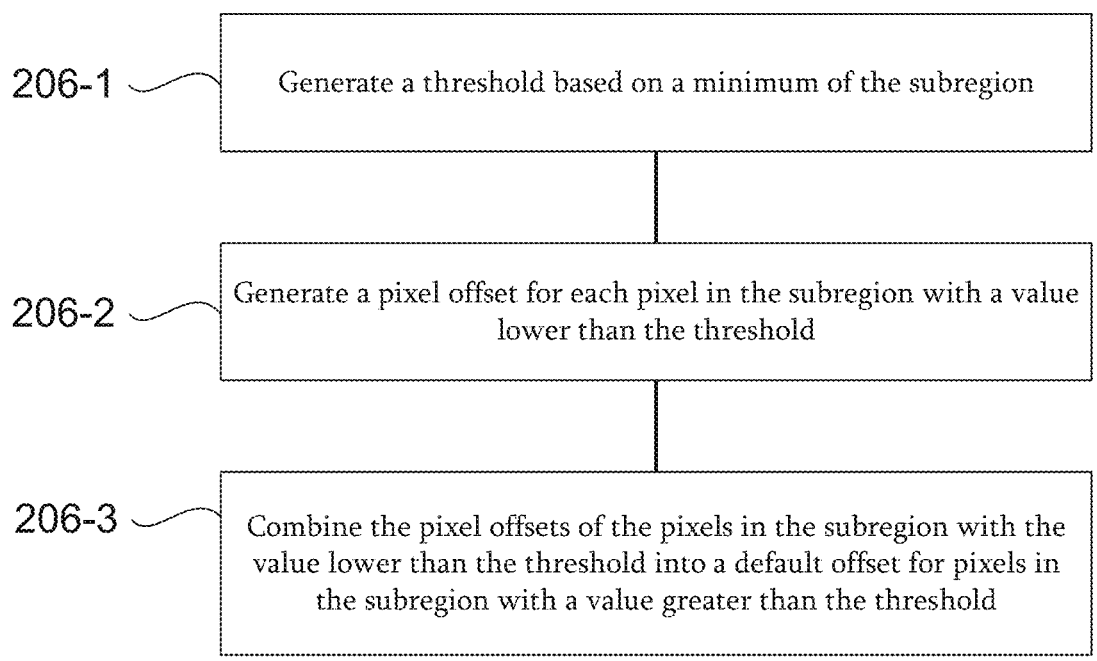
FIG. 6 is a flowchart of offset estimation in an image processing technique with scatter correction according to some embodiments.

FIG. 6 is a flowchart of offset estimation in an image processing technique with scatter correction according to some embodiments. The operations 206-1 to 206-3 are examples of operations that may be included in operation 206 of FIG. 2A or FIG. 2B. In some embodiments, for each row, the area where the intensity is lowest is determined (and the effect of external scatter is prominent), then compare the simulated signal with the measurement to obtain the discrepancy. The amount of the discrepancy is the offset b. A threshold is used to determine if an intensity is sufficiently low. The threshold is the row minimum multiplied by a constant.

In some embodiments, the operations 206-1 to 206-3 are performed for each of multiple subregions of the measured radiation $I_m$. In 206-1, a threshold is generated based on a minimum of the subregion. For example, a minimum value within the subregion may be scaled by a factor larger than 1 such as 1.1, 1.5 or the like. As will be described in further detail below, this threshold may be used to divide pixels into those for which an offset b is calculated individually and those having an offset b that is calculated based on the other individually calculated offsets b.

In particular, in 206-2, a pixel offset is generated for each pixel in the subregion with a value lower than the threshold. In some embodiments, the offset b may be calculated by Expression 9:

$$b(i,\text{subregion})=I_m(i,\text{subregion})-\lambda \times J_{tot}(i,\text{subregion}) \quad \text{Expression 9}$$

In 206-3, the pixel offsets of the pixels in the subregion with the value lower than the threshold are combined into a default offset for pixels in the subregion with a value greater than the threshold. For example, the offsets b from 206-2 may be averaged to generate on offset bused for the other pixels. In other embodiments, other techniques, such as a median, a weighted average, or the like may be used to combine the offsets b.

The use of the threshold that is greater than 1 allows for the division of pixels that are used to generate individual offsets b to be controlled. For example, the threshold may be selected so that rather than a single pixel, i.e., the pixel with the minimum value, multiple pixels with lower values within the subregion may be used to reduce an effect of noise.

As described above, an offset b may be generated for each pixel. As a result, the offset b is an offset image including the offsets b of the pixels in the subregion with the value lower than the threshold and the default offset. In some embodiments, the offset image may be smoothed on a subregion basis or on the offset image as a whole. The smoothing may soften any discontinuities that may appear due to the different treatment of some pixels. The smoothing may be performed by applying a median filter, a box filter, a bilateral filter, a spline, Gaussian filter, low-pass filter, or other types of filters. Some filters such as the median filter have an advantage of using just one parameter and provides consistent results and improved image quality. In some embodiments, the size of the filter may be based on a size of the image. For example, the filter may have a size of 50 millimeters (mm) while the image has a size of about 2000 mm.

In some embodiments, the offset image may be clamped to have a limit. For example, the offset image may be clamped at a lower bound such that the offset image does not pass that lower bound. In a particular example, the lower bound may be zero or a negative number. As a result, large negative numbers may be clamped.

In some embodiments, with the gain λ computed, a basic mapping between the simulated measured radiation $J_{tot}$ and the measured radiation $I_m$ exists, and the offset b may be determined. In some embodiments, the offset b may include the external scatter. The offset b may be expected to vary from pixel to pixel in a smooth fashion. For example, in industrial imaging, a turntable typically used to rotate the object 108 often generates external scatter, thus the external scatter typically has a larger variation from row to row than from column to column (where a row is orthogonal to the rotation axis), therefore the external scatter may be estimated on a row-by-row basis. That is, the row may define the subregions. However, in other embodiments, the subregions may be defined by the orientation of the radiation detector 106 to the object 114 generating the external scatter. The subregions may include columns, diagonal regions of pixels, curved regions of pixels or the like.

Figure 7:
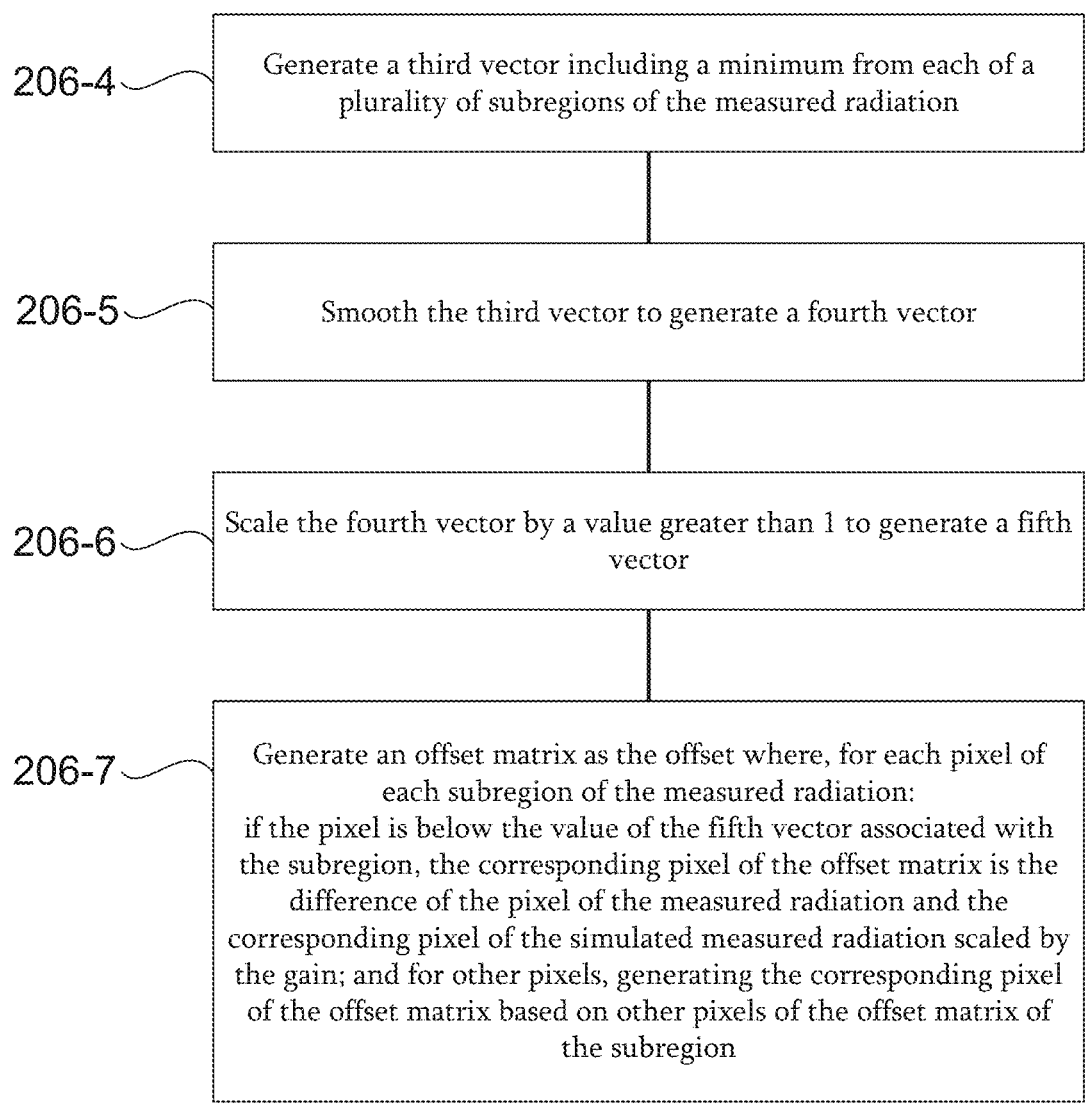
FIG. 7 is a flowchart of offset estimation across subregions in an image processing technique with scatter correction according to some other embodiments.

FIG. 7 is a flowchart of offset estimation across subregions in an image processing technique with scatter correction according to some other embodiments. The operations 206-4 to 206-7 are examples of operations that may be included in operation 206 of FIG. 2A or FIG. 2B.

In 206-4, a third vector including a minimum from each of a plurality of subregions of the measured radiation $I_m$ is generated. For example, for each row in the measured radiation $I_m$, a minimum value is found. The third vector is created containing the minima from each row. The length of the third vector is the number of rows in the measured radiation $I_m$.

In 206-5, the third vector is smoothed to generate a fourth vector. The smoothing may be performed using a variety of techniques such as by applying a median filter, a box filter, a bilateral filter, a spline, Gaussian filter, low-pass filter, or other types of filters. The filters may operate over, typically for a few pixels of length. Thus, the fourth vector may include a row-by-row smoothed minimum value. In some embodiments, a median filter reduces the noise while not inducing signal overflow or overshoot to a row from an adjacent row, which can be helpful when the object has an abrupt change in its attenuation in the axial direction (i.e., from row-to-row).

In 206-6, the fourth vector is scaled by a value greater than 1 to generate a fifth vector. As described above with respect to operation 206-1, the minima may be scaled by a factor greater than 1. Scaling the fourth vector generates the threshold similar to 206-1 but for every row. The scaling may be optimized for different applications with a tradeoff between offset accuracy and noise reduction. A smaller value tends to give a more accurate offset b, while a larger value that results in more pixels in the calculation, may help reduce noise.

In 206-7, an offset matrix is generated as the offset b where, for each pixel of each subregion of the measured radiation $I_m$ if the pixel value is below the value of the fifth vector associated with the subregion, the corresponding pixel of the offset matrix is the difference of the pixel value of the measured radiation and the corresponding pixel value of the simulated measured radiation scaled by the gain λ. In addition, for other pixels, the corresponding pixel value of the offset matrix is generated based on other pixel values of the offset matrix of the subregion. This operation 206-7 may be similar to the operations 206-2 and 206-3 described above for each row.

Figure 8C:
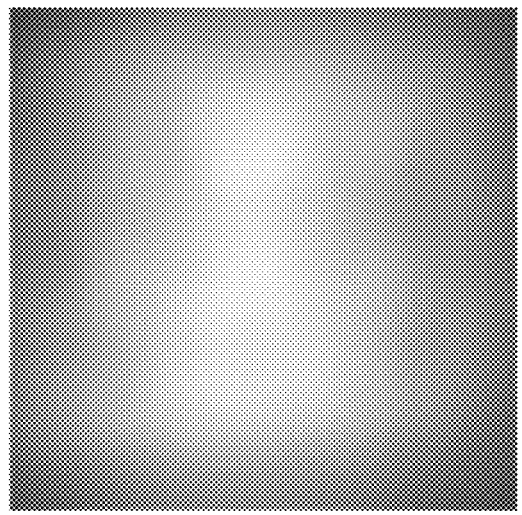
FIG. 8C illustrates a simulated scatter radiation image $J_s$.
Figure 8B:
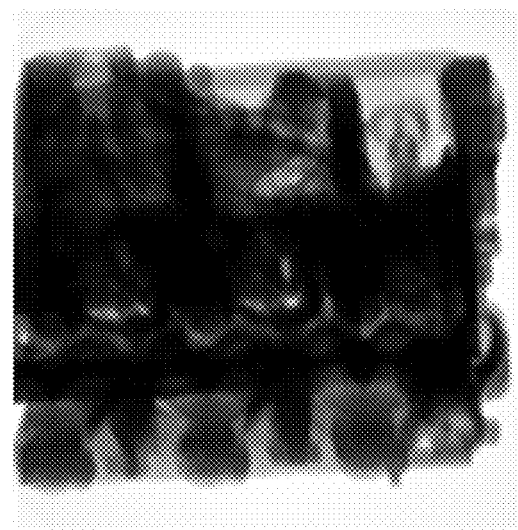
FIG. 8B illustrates a simulated primary radiation image $J_p$.
Figure 8A:
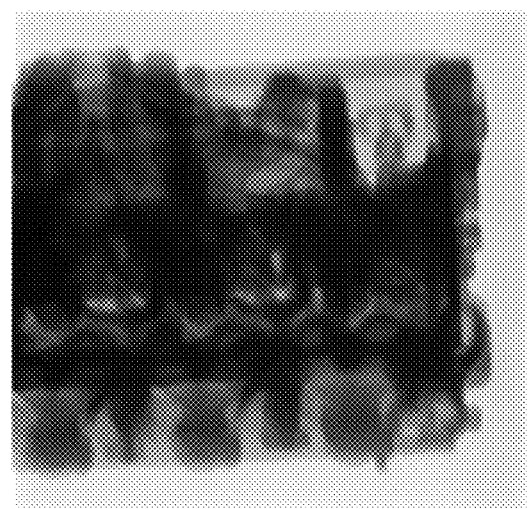
FIG. 8A illustrates a measured radiation image $I_m$.

FIG. 8A illustrates a measured radiation image $I_m$. FIG. 8B illustrates a simulated primary radiation image $J_p$. FIG. 8C illustrates a simulated scatter radiation image $J_s$. The combination of the simulated primary radiation $I_p$ and the simulated scatter radiation $J_s$ may form the simulated measured radiation $J_{tot}$.

Figure 9A:
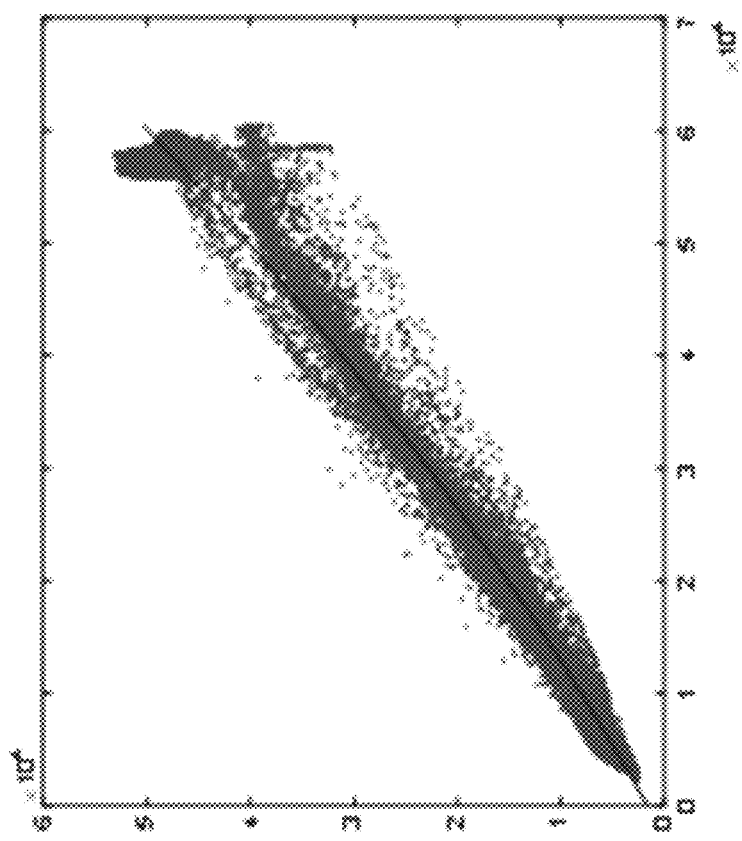
FIG. 9A illustrates a scatter plot of a first pass of second order polynomial fit of a measured radiation image $I_m$ to a simulated radiation image $J_{tot}$d.

FIG. 9A illustrates a scatter plot of a first pass of a second order polynomial fit of a measured radiation $I_m$ with a corresponding simulated radiation image $J_{tot}$ with a full image ROI. The y-axis represents the measured radiation $I_m$ and the x-axis represents the simulated measured radiation $J_{tot}$ from FIGS. 8A-8C with each pixel as a point in red and a fitted curve in blue. This fitted curve may be the result of operation 204-1 or other similar operations.

Figure 9B:
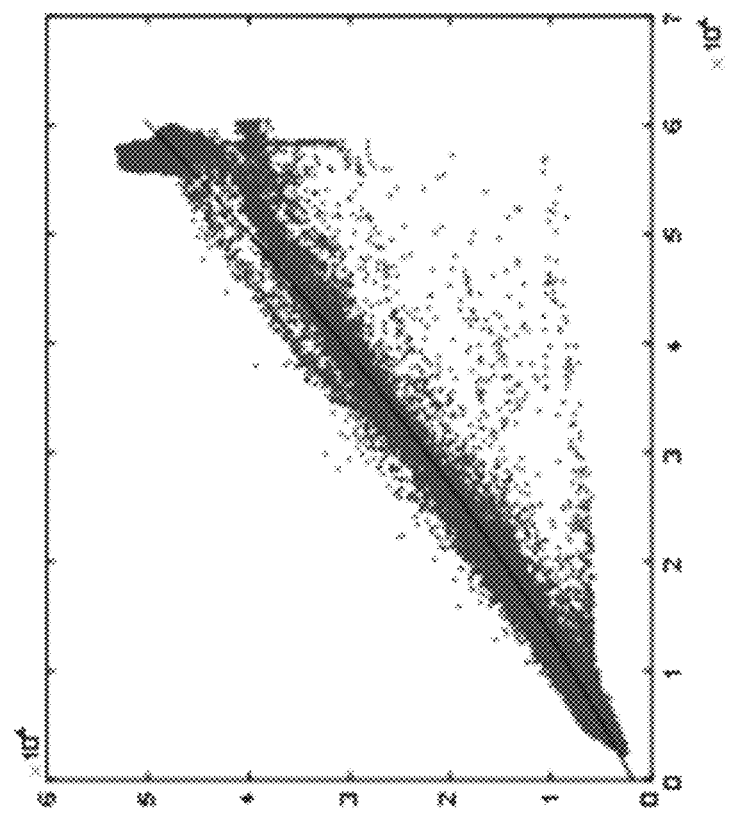
FIG. 9B illustrates a scatter plot of a second pass of second order polynomial fit of a measured radiation image $I_m$ to a simulated radiation image $J_{tot}$ with the outlier excluded.

FIG. 9B illustrates a scatter plot of a second pass of a second order polynomial fit of a measured radiation image $I_m$ with a corresponding simulated radiation image $J_{tot}$ with outliers with an error greater than 50 percent (>50%) excluded. The y-axis represents the measured radiation $I_m$ and the x-axis represents the simulated measured radiation $J_{tot}$ from FIGS. 8A-8C with each pixel as a point in red and a fitted curve in blue after outlier exclusion. The linear term is 0.608, which is the gain λ for this illustrated projection. This fitted curve may be the result of operation 204-4 or other similar operations.

Figure 10:
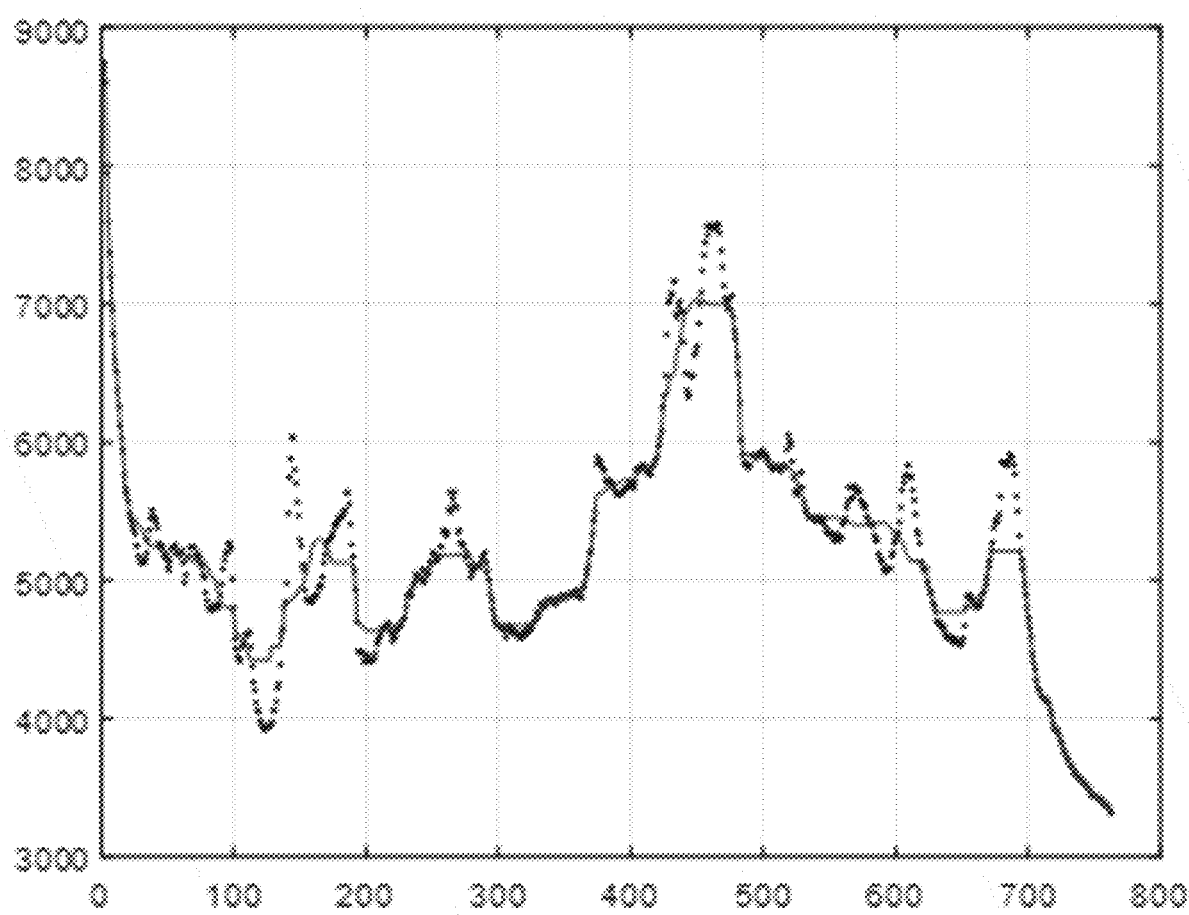
FIG. 10 illustrates a graph of column vectors.

FIG. 10 illustrates a graph of column vector. The blue dotted line is vector with the minimum of each row as in operation 206-4. The vector is then smoothed with one of the filters described above to show the noise reduced vector represented by the red solid line as in operation 206-5 before the vector is used to produce the offset image.

Figure 11B:
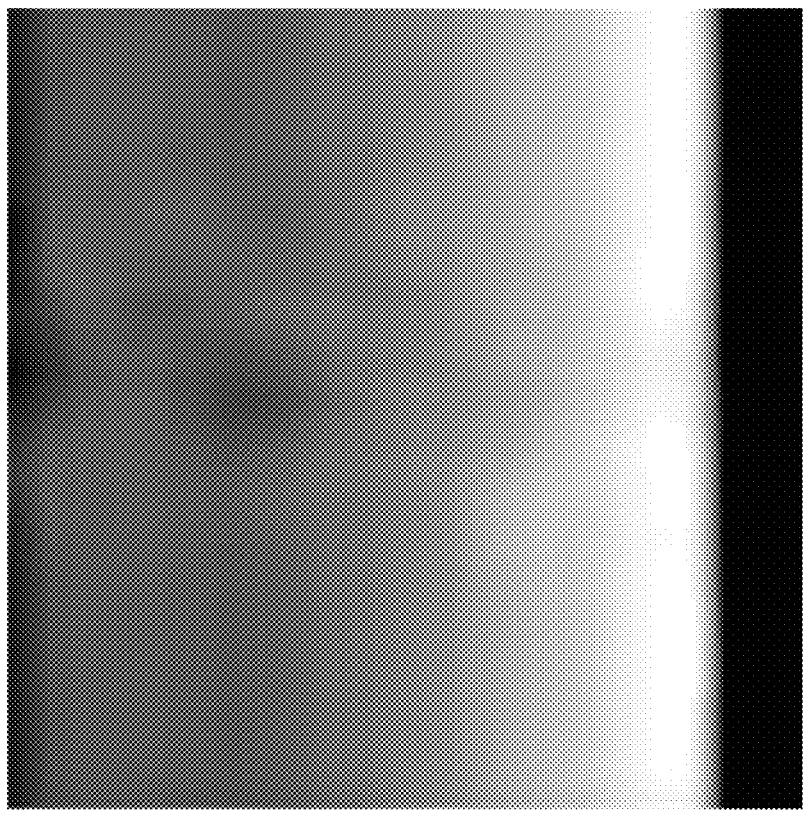
FIG. 11B illustrates a smoothed offset image.
Figure 11A:
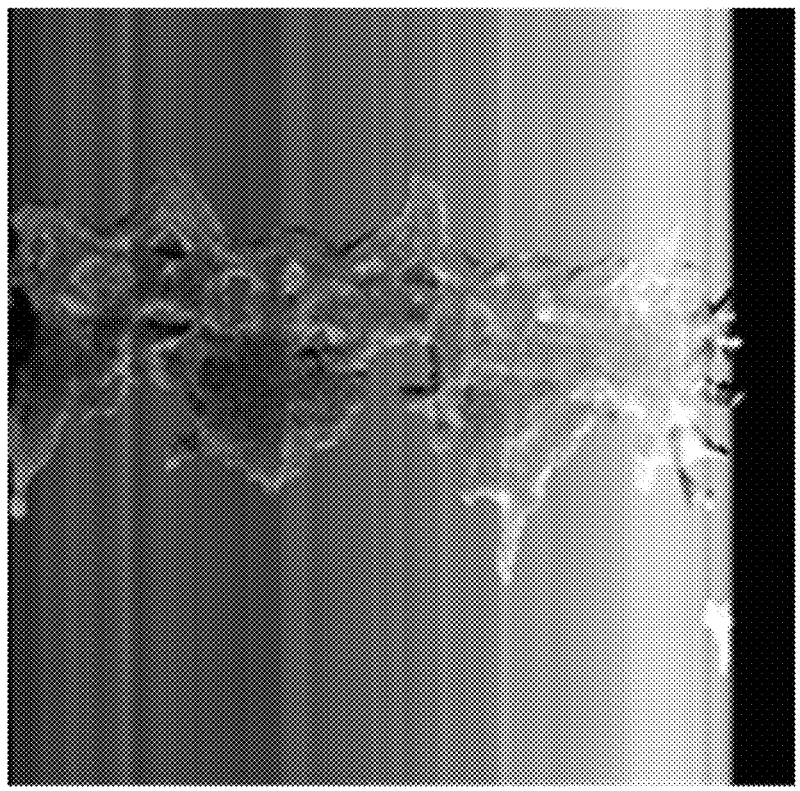
FIG. 11A illustrates an offset image.

FIG. 11A illustrates an offset image from operation 206-7 before smoothing, and FIG. 11B illustrates the offset image after smoothing. Because of the use of the threshold T for each row, only a portion of the image has a direct calculation of the offset. The rest of the image is filled with an average of available offsets from each row as illustrated in FIG. 11A. After filtering with a box filter (e.g., 50 mm filter), the offset becomes smooth, which becomes the calculated external scatter.

Figure 12B:
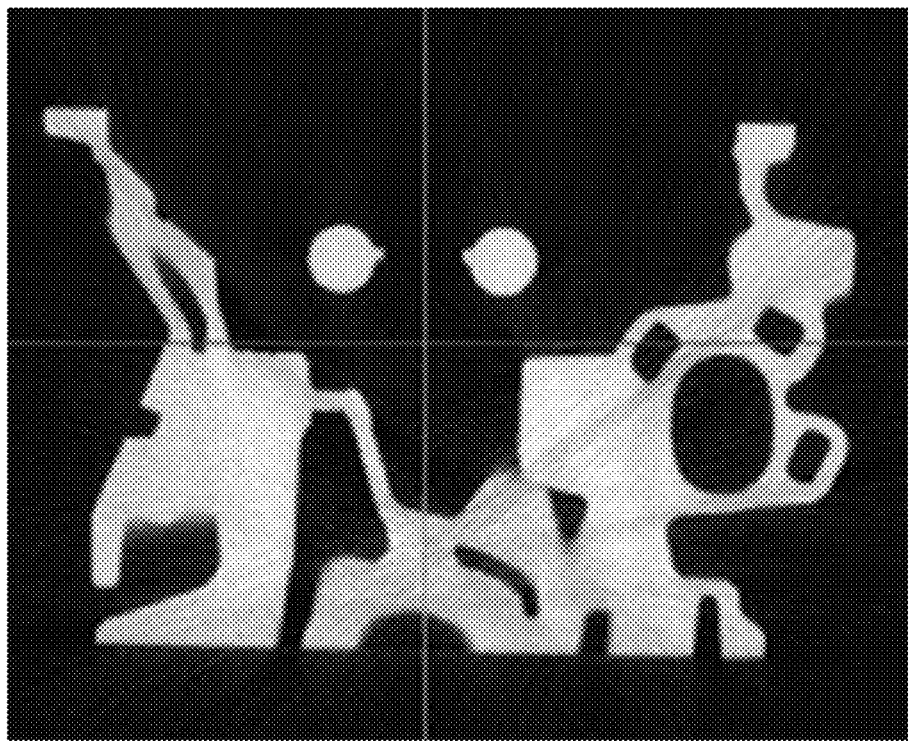
FIG. 12B illustrates a reconstructed image with background or external scatter correction.
Figure 12A:
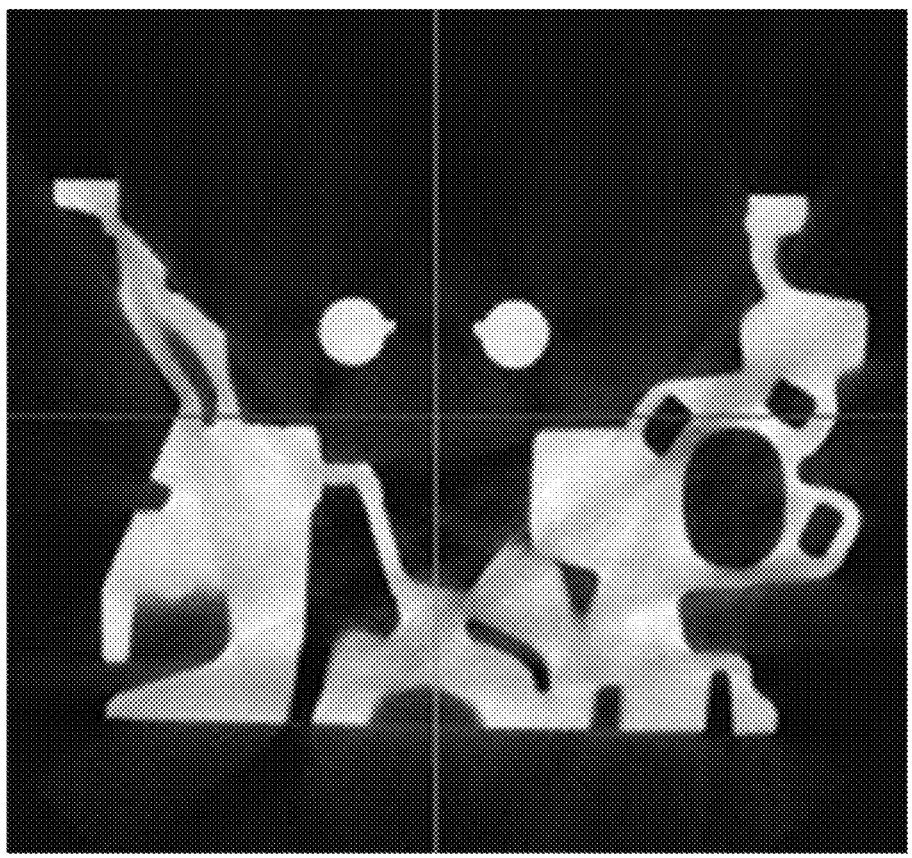
FIG. 12A illustrates a reconstructed image without background or external scatter correction.

FIG. 12A illustrates a reconstructed image without background or external scatter correction. FIG. 12B illustrates a reconstructed image with background or external scatter correction using the technology described. As shown, the image uniformity is improved.

As described above, some embodiments include a scalar gain λ and a spatially varying offset b. In other embodiments, the gain λ may remain a scalar and the offset bis changed to a scalar. A scalar offset b may be referred to as a static offset or static background. Both the offset b and the gain λ may be calculated differently. For example, the high intensity region such as an air region may be used for the gain calculation, and the most attenuated area (or low intensity region) may be used for the offset calculation.

Figure 13:
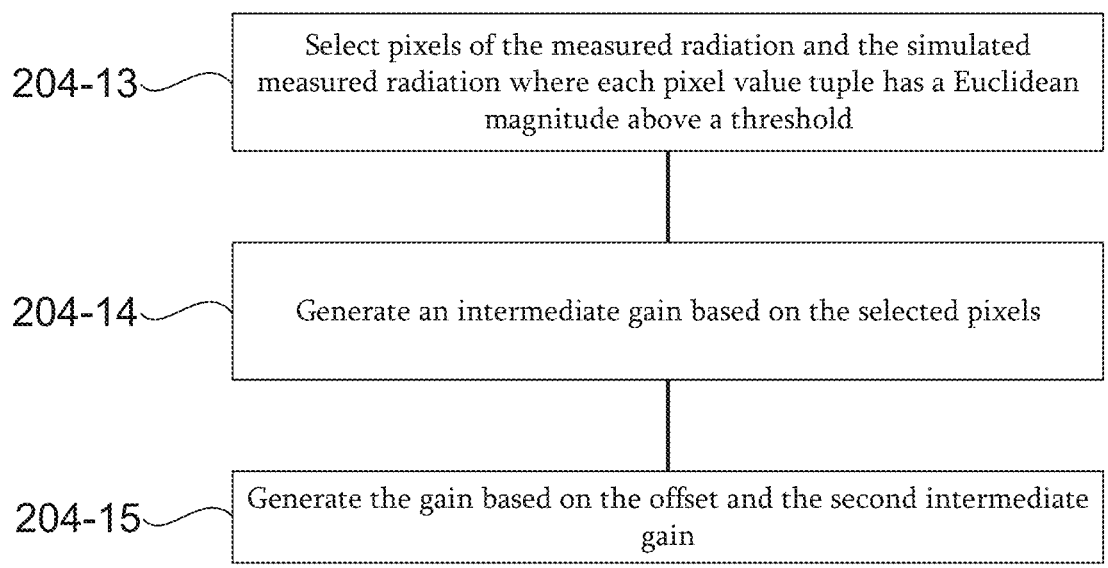
FIG. 13 is a flowchart of gain estimation in an image processing technique with scatter correction according to some other embodiments.

FIG. 13 is a flowchart of gain estimation in an image processing technique with scatter correction according to some embodiments. The operations 204-13 to 204-15 are examples of operations that may be included in operation 204 of FIG. 2A.

In 204-13, pixels of the measured radiation $I_m$ and the simulated measured radiation $J_{tot}$ are selected where each pixel value tuple has a Euclidean magnitude above a threshold. For example, for each pixel value tuple of the measured radiation $I_m$ and the simulated measured radiation $J_{tot}$, the Euclidian magnitude r may be calculated as in Expression 10.

$$r=\sqrt{I_m^2+(g_1 J_{tot})^2} \qquad \text{Expression 10}$$

$g_1$ is a rough gain estimate. In some embodiments, $g_1$ may be generated based on the measured radiation $I_m$ and the simulated measured radiation $J_{tot}$; however, in other embodiments, $g_1$ may be 1. Higher intensity values of the measured radiation $I_m$ will likely have higher intensity values in the corresponding pixel of the simulated measured radiation $J_{tot}$. These higher intensity values may give a better estimate for the gain λ.

The threshold is used to select the higher intensity values. For example, the threshold may be 95% of a maximum of the r (referred to as $m_3$). 95% is merely an example and may be any number near 1 to select a desired amount of higher intensity pixels.

In 204-14, an intermediate gain $g_2$ is generated based on the selected pixels. For example, an intermediate gain $g_2$ may be generated using Expression 11:

$$g_2 = \text{average}\left(\frac{I_m(k)}{J_{tot}(k)}\right) \qquad \text{Expression 11}$$

for all $k$ satisfying $r(k) > 0.95\ m_3$

In 204-15, the gain λ is generated based on the offset and the second intermediate gain $g_2$. As will be described in further detail below, the offset b may be generated and then used to further refine the gain λ.

Figure 14:
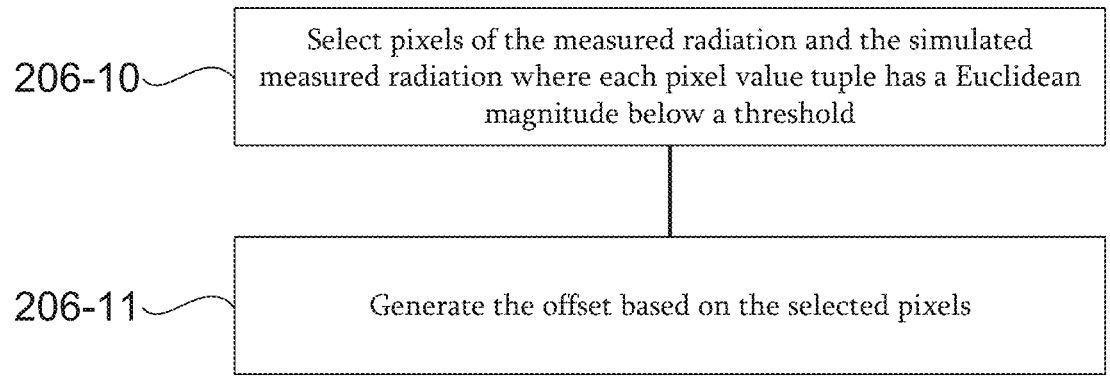
FIG. 14 is a flowchart of offset estimation in an image processing technique with scatter correction according to some other embodiments.

FIG. 14 is a flowchart of offset estimation in an image processing technique with scatter correction according to some other embodiments. In 206-10, pixels of the measured radiation and the simulated measured radiation are selected where each pixel value tuple has a Euclidean magnitude below a threshold. Similar to operation 204-13, in 206-10, pixels may be selected using a threshold; however, the selection and the threshold are implemented to select the pixels with the lower Euclidean magnitude. The threshold may be based on the minimum Euclidian magnitude ($m_4$). For example, the threshold may be 1.1 times $m_4$. The value of 1.1 is an example and may be any value greater than 1 to select the desired amount of lower intensity pixels.

In 206-11, the offset bis generated based on the selected pixels. Expression 12 is an example of the selection criteria and the generation of the offset b.

$$b=\text{average}(I_m(k)-g_2 J_{tot}(k)) \text{ for all } k \text{ satisfying } r(k) < 1.10 m_4 \qquad \text{Expression 12}$$

Here, for the selected pixels, the scaled simulated measured radiation $J_{tot}$ is subtracted from the measured radiation $I_m$. The scaling for the simulated measured radiation $J_{tot}$ is the intermediate gain $g_2$. The offset bis the average of those values over all of the selected pixels.

Figure 15:
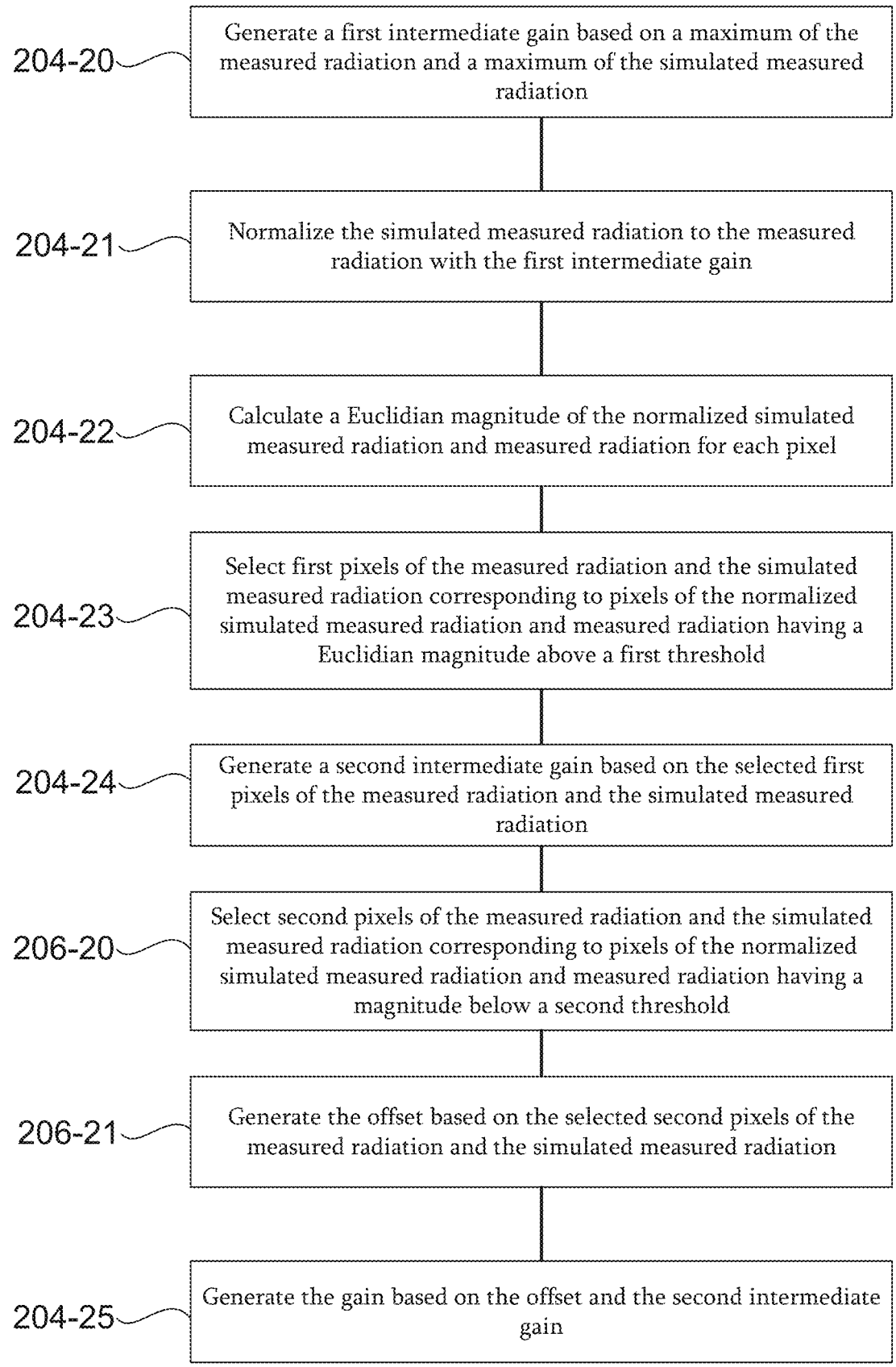
FIG. 15 is a flowchart of gain and offset estimation in an image processing technique with scatter correction according to some embodiments.

FIG. 15 is a flowchart of gain and offset estimation in an image processing technique with scatter correction according to some embodiments. In 204-20, a first intermediate gain is generated based on a maximum of the measured radiation and a maximum of the simulated measured radiation. For example, a maximum of the measured data $I_m$ ($m_1$) and a maximum of the simulated measured radiation $J_{tot}$ ($m_2$) are found. The first intermediate gain $g_1$ is estimated as $m_1/m_2$. The rough gain estimate $g_1$ may not be accurate but may be used as a starting point to generate a valid final gain $\lambda$ and offset b.

In 204-21, the simulated measured radiation is normalized to the measured radiation $I_m$ with the first intermediate gain. In some embodiments, the simulated measured radiation $J_{tot}$ is scaled with the first intermediate gain $g_1$ as in Expression 10, above. However, the calculation of the first intermediate gain $g_1$ may be inverted. The simulated measured radiation $J_{tot}$ may be scaled by the inverse of that first intermediate gain $g_1$, the measured radiation $I_m$ may be scaled by the first intermediate gain $g_1$, or the like. Regardless, the simulated measured radiation $J_{tot}$ is normalized to the measured radiation $I_m$.

In 204-22, a Euclidian magnitude of the normalized simulated measured radiation and measured radiation is calculated for each pixel. The Euclidean magnitude may be calculated similar to operation 204-13 as described above or as appropriate given the normalization technique.

In 204-23, first pixels of the measured radiation and the simulated measured radiation corresponding to pixels of the normalized simulated measured radiation $J_{tot}$ and measured radiation $I_m$ having a Euclidean magnitude above a first threshold are selected. In 204-24, a second intermediate gain $g_2$ is generated based on the selected first pixels of the measured radiation $I_m$ and the simulated measured radiation $J_{tot}$. These operations may be similar to the operations in 204-13 and 204-14 as described above.

In 206-20, second pixels of the measured radiation $I_m$ and the simulated measured radiation $J_{tot}$ corresponding to pixels of the normalized simulated measured radiation $J_{tot}$ and measured radiation $I_m$ having a magnitude below a second threshold are selected. This operation may be similar to the operation 206-10.

In 206-21, the offset is generated based on the selected second pixels of the measured radiation $I_m$ and the simulated measured radiation $J_{tot}$. This operation may be similar to the operation 206-11.

In 204-25, the gain is generated based on the offset and the second intermediate gain $g_2$. In some embodiments, the second intermediate gain $g_2$ is adjusted to reflect the existence of offset b to reach the final gain $g_3$ (or $\lambda$), which is calculated using Expression 13:

$$\lambda \equiv g_3 = g_2 - \frac{b}{\text{average}(J_{tot}(k)) \forall\, r(k) > 0.95\, m_3} \qquad \text{Expression 13}$$

The same threshold, 0.95 in this example, used above in Expression 11 may be used here as selection criteria for selecting pixels of the simulated measured radiation $J_{tot}$ in Expression 13.

In some embodiments a static background offset may be calculated as in Expression 14.

$$b = I_m(r==m_4) - g_2 * J_{tot}(r==m_4) \qquad \text{Expression 14}$$

In some embodiments, in the gain calculation described above with respect to FIG. 3-5, the 0th term from the polynomial fitting represents a gross offset of the image. That value is not used as the static, scalar, or invariant offset, because that gross offset value is derived from most, if not all, pixels in the ROI. In some examples, it is more accurate to just use the darkest pixels for the static offset calculation (i.e., the intercept at the ordinate) as they are close to the ordinate, than using all pixels with all intensities.

Figures 16A, 16B, 16C:
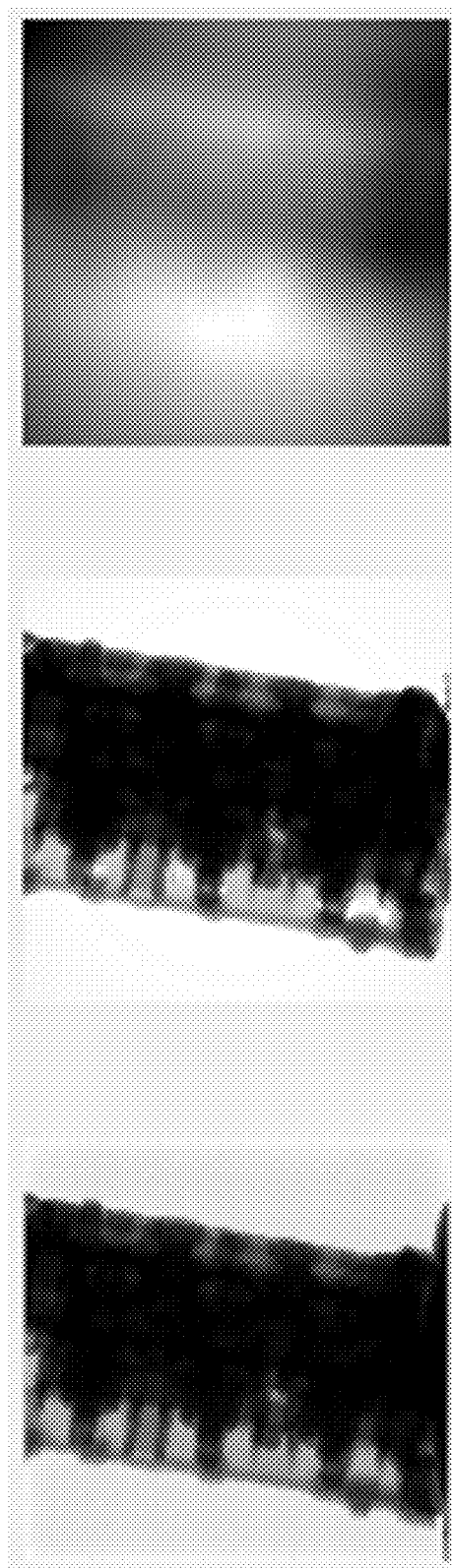
FIG. 16A illustrates a measured radiation image $I_m$.
FIG. 16B illustrates a simulated primary radiation image $J_p$.
FIG. 16C illustrates a simulated scatter radiation image $J_s$.

FIG. 16A illustrates a measured radiation image $I_m$. FIG. 16 illustrates a simulated primary radiation image $J_p$. FIG. 16C illustrates a simulated scatter radiation image $J_s$. From these, the first intermediate gain $g_1$ is calculated as 0.518. The first intermediate gain $g_1$ is used to scale the simulated total to make a plot of measured radiation versus simulated radiation points. The distance is computed to the origin for each data point. Those data points located within 5% from the furthest point are selected (and used to calculate gain) and those data points located within 10% from the nearest point are selected (and used to calculate offset). The thresholds of 5% and 10% are merely examples and may be different percentages, different values, or the like in other embodiments.

Figure 17:
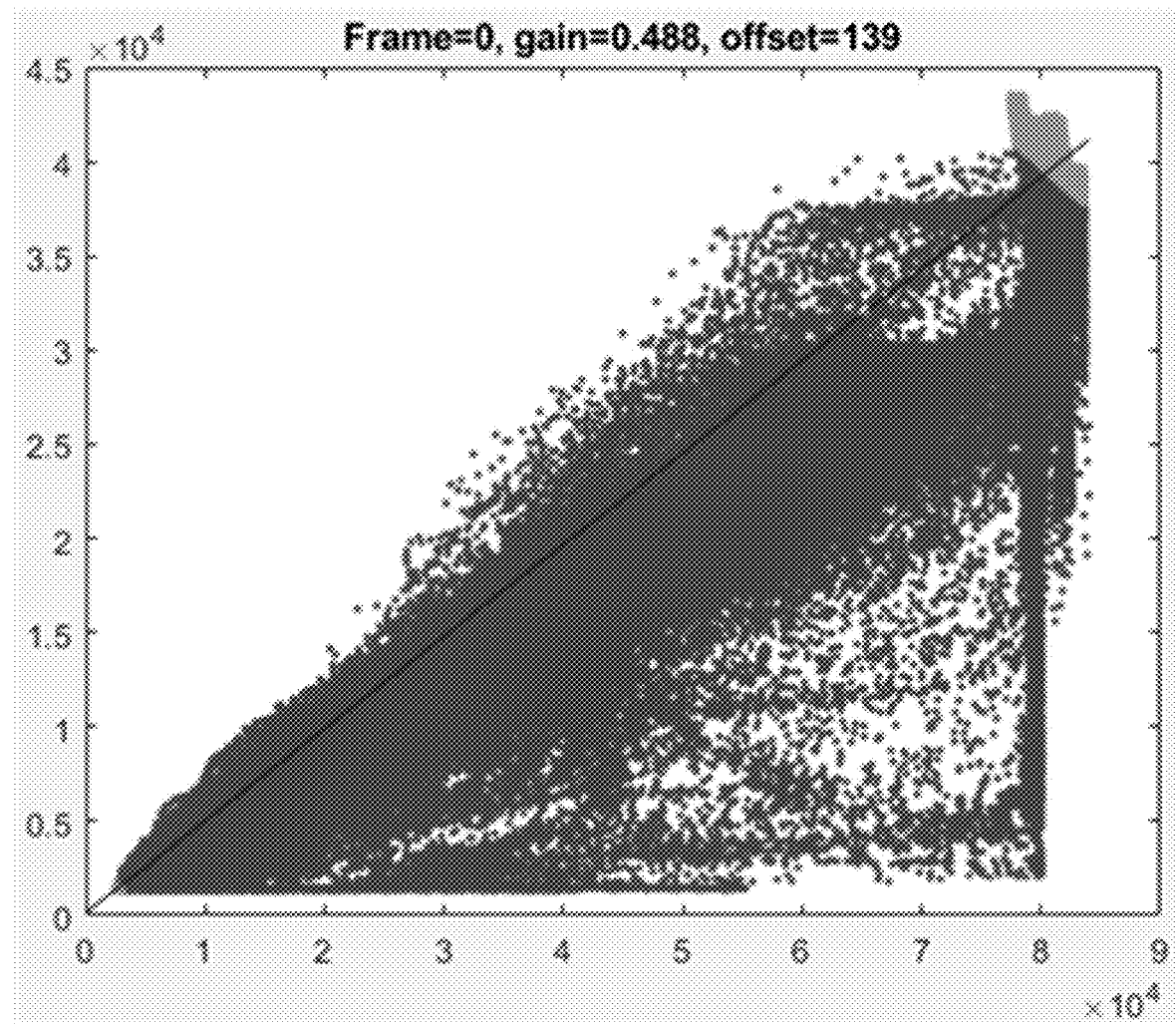
FIG. 17 illustrates a scatter plot or graph of the normalized measured radiation image $I_m$ to a simulated measured radiation image $J_{tot}$.

FIG. 17 illustrates a scatter plot or graph of the normalized measured radiation image $I_m$ to a simulated measured radiation image $J_{tot}$. The y-axis represents the measured radiation $I_m$ and the x-axis represents the simulated measured radiation $J_{tot}$ with each pixel as a point in red and a fitted curve in blue. The green cluster of points in the upper right corner represents the data used in 204-23 (for the gain) and the green cluster of points in the lower left corner represents the data used in 206-20 (for the offset).

Figure 18:
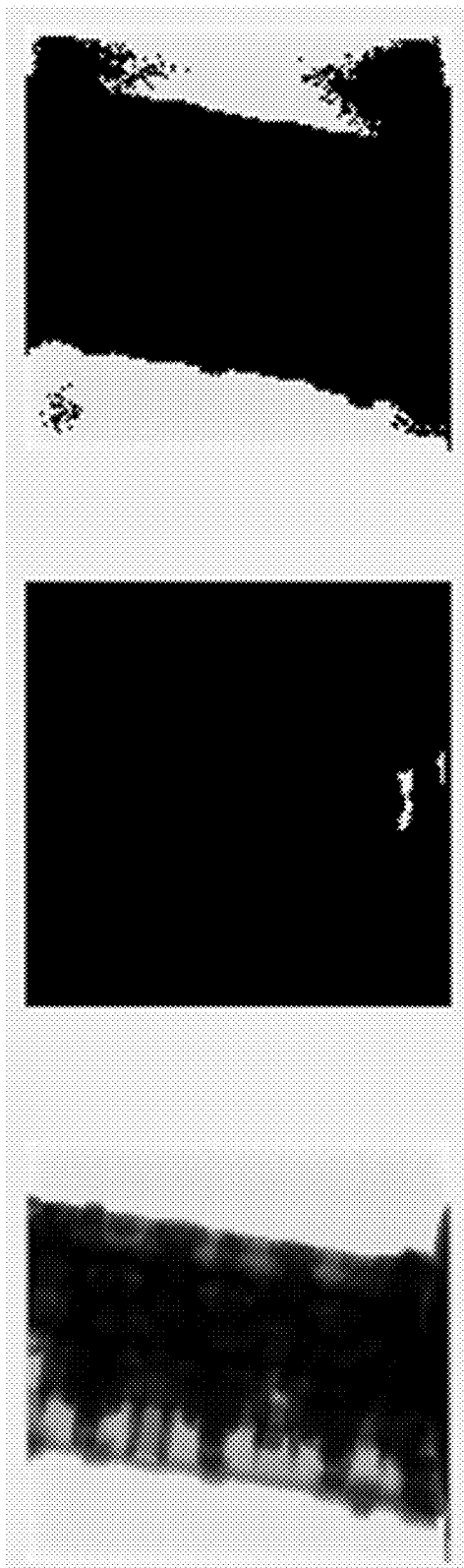
FIG. 18A illustrates a measured radiation image.
FIG. 18B illustrates pixels used in offset calculation.
FIG. 18C illustrates pixels used in gain calculation.

FIG. 18A illustrates a measured radiation image $I_m$ for reference. FIG. 18B illustrates pixels (shown in white) used in offset calculation in 206-20, and FIG. 18C illustrates pixels (shown in white) used in gain calculation in 204-23. FIGS. 18B-10C illustrate images showing the pixels corresponding to the green points in the scatter plot of FIG. 17.

Once the near and far data points are identified, the points can be used as described above to compute the gain $\lambda$ and offset b. In this example, the gain $\lambda$ is 0.488 and the offset b is 139.

In some embodiments, both the gain $\lambda$ and offset b may be spatially varying. Having a spatially-dependent gain $\lambda$ can be useful in a number of different application. In particular, many sources of possible inaccuracies can exist in the model or simulation, including the x-ray spectrum, target composition, inherent filtration, heel effect, object material composition and density, scintillator response, detector linearity, and the like, and many of these factors can manifest as non-linearities in the data. Using a Taylor series approximation, many of these nonlinear effects can be compensated at least in part by a spatially varying gain $\lambda$. However, estimating a spatially varying gain $\lambda$ can pose some technical hurdles, which are identified below.

One challenge of simultaneous estimation of both gain and background can be summarized by aiming to solve the third equation (i.e., $I_m = \lambda J_{tot} + b$) in Expression 6 simultaneously for many pixels, which can be restated as Expression 15:

$$I_m[i] = \lambda[i] J_{tot}[i] + b[i] \qquad \text{Expression 15}$$

i, a positive integer, is the pixel index. If there are N pixels, i goes from 1 to N Then Expression 15 represents a system of N equations, where N is typically large. If b and $\lambda$ are independent of i (that is, both b and $\lambda$ are scalars) then there are N equations and two unknowns, thus the system of equations can typically be expected to have a well-defined solution, and the problem lends itself to using algorithms such as those described above. If λ is a matrix but b is a scalar, then there are N equations with N+1 unknowns, which is not directly solvable, but an algorithm described above gets around this issue by first solving for a scalar λ using a polynomial fit (N equations, and the unknowns are equal to the number of polynomial coefficients, which is much smaller than N), and then fixing λ and solving for a select set of b (N equations with a maximum of N unknowns). However, if both λ and b are matrices, then without additional assumptions, there are N equations with 2N unknowns, and so Expression 14 is an ill-posed problem. For example, these degenerate solutions are all technically valid in Expressions 16-18, but none are particularly meaningful:

$$\lambda[i]=0 \text{ and } b[i]=I_m[i] \text{ for all pixels} \quad \text{Expression 16}$$

$$\lambda[i]=I_m[i]/J_{tot}[i] \text{ and } b[i]=0 \text{ for all pixels} \quad \text{Expression 17}$$

$$\lambda[i]=1 \text{ and } b[i]=I_m[i]-J_{tot}[i] \text{ for all pixels} \quad \text{Expression 18}$$

Thus some additional assumptions or constraints may be used in order to make the problem well-defined. Some embodiments include an approach similar to those described above, except instead of finding λ for all pixels, we instead find λ for a local subregion of pixels, and repeat the process for a set of subregions of pixels.

Figure 19:
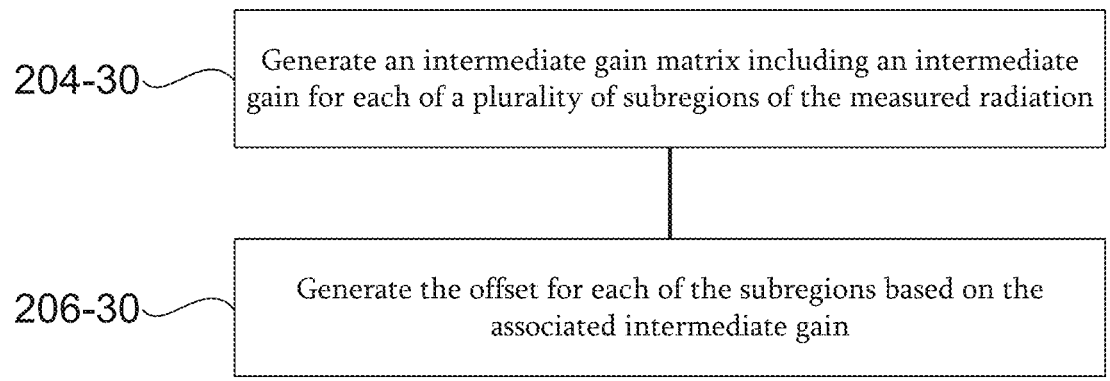
FIG. 19 is a flowchart of gain and offset estimation in an image processing technique with scatter correction according to some embodiments.

FIG. 19 is a flowchart of gain and offset estimation in an image processing technique with scatter correction according to some embodiments. In 204-30, an intermediate gain matrix is generated including an intermediate gain for each of a plurality of subregions of the measured radiation. The intermediate gain may be calculated as in operation 204-11 as described above. In 204-30, the offset for each of the subregions is generated based on the associated intermediate gain. For example, the offset b may be generated as in operation 206-11 as described above. As a result, the gain λ and offset b may be spatially varying at least across subregions even when the gain λ or offset b is a scalar in the subregion.

Some embodiments incorporate the smoothness criteria for in both gain λ and offset b. Using smoothness is motivated by the observation that most of the non-idealities should be expected to be slowly varying. Consider the cost function of Expression 19:

$$E=1/2\|A\lambda+b-m\|^2+\alpha\|\nabla\lambda\|^2+\beta\|\nabla b\|^2 \quad \text{Expression 19}$$

$A=J_{tot}$, $m=I_m$, the vector norms are taken across all i, $\nabla$ is the gradient (i.e., spatial derivative) operator, and α and β are scalar parameters. Thus the first term (i.e., $1/2\|A\lambda+b-m\|^2$) in the right side of Expression 19 represents the total squared error in Expression 14 summed across all pixels, while the second term (i.e., $\alpha\|\nabla\lambda\|^2$) penalizes the roughness (i.e., the opposite of smoothness) of λ, and the third term (i.e., $\beta\|\nabla b\|^2$) penalizes the roughness of b. Note that λ is spatially constant if and only if $\nabla\lambda=0$ for all i, which in turn is true if and only if the second term in the right side of Expression 19 is zero. Furthermore, when minimizing E, the larger the α, the more likely the second term is to be closer to zero. Thus α functions as a smoothness control for gain λ, where minimizing E with larger values of α will yield smoother λ, and minimizing E with smaller values of α will yield rougher λ. Similarly, β functions as a smoothness control for offset b.

The first order optimality criteria for Expression 19 are in Expressions 20-21:

$$(A^tA+\alpha\nabla^t\nabla)\lambda+A^tb-A^tm=0 \quad \text{Expression 20}$$

$$A\lambda+(I+\beta\nabla^t\nabla)b-m=0 \quad \text{Expression 21}$$

Expressions 20-21 rewritten into matrix form, minimizing Expression 19 is equivalent to solving for λ and b in Expression 22:

$$\begin{bmatrix}(A^tA+\alpha\nabla^t\nabla) & A^t \\ A & (I+\beta\nabla^t\nabla)\end{bmatrix}\begin{bmatrix}\lambda \\ b\end{bmatrix}=\begin{bmatrix}A^tm \\ m\end{bmatrix} \quad \text{Expression 22}$$

Expression 22 has 2N equations and 2N unknowns, which can be solved with well-known linear system solvers, or Expression 19 can be solved directly with least-squares or quadratic-optimization solvers.

There are many reasonable variations of the cost function in Expression 18, including non-quadratic error terms, or other ways of representing the gain and offset values. For example, the gain and offset values can be represented by a lower-order spline (or other transform), where λ=Fc and b=Gd where F and G are spline (or transform) bases and c and d are spline (or transform) coefficients. Then Expression 18 can be represented by a lower-order spline as Expression 22 or Expression 23 either of which can be solved by similar techniques used to solve Expression 19:

$$E=1/2\|AFc+SGd-m\|^2+\alpha\|\nabla Fc\|^2+\beta\|\nabla Gd\|^2 \quad \text{Expression 23}$$

$$E=1/2\|AFc+SGd-m\|^2+\alpha\|\nabla c\|^2+\beta\|\nabla d\|^2 \quad \text{Expression 24}$$

After solving for c and d, λ=Fc and b=Gd are applied to obtain the desired gain λ and offset b values.

In some embodiments, the offset extrapolation can be performed with other more sophisticated methods, including but not limiting to linear interpolation or extrapolation, extension of the edge pixels, splines, pixel inpainting, sparse image recovery, and the like.

In some embodiments, the calculated offset b can have negative values. The negative offset b values may be due to different reasons, such as reasonable error from calculation, beam hardening effect that is not fully accounted for, other inconsistencies in the measured data, or other preprocessing steps with inaccuracies or overcorrection. Accepting the negative scatter as-is can be preferred or desirable, since even though a negative offset may not physically realistic, the negative offset b can often provide a good mathematical approximation to correct other non-idealities in the data. However, in other examples, applying a lower bound to clamp negative scatter to a fixed minimum value may be preferred or desirable. This can be done for example by using quadratic optimization to solve Expression 19 and incorporating a linear constraint that b≥0.

The scalar offset, or static background, can be useful in situations where the external scatter is fairly uniform across the detector, or when a constant offset is left in the detector's offset calibration either purposely or unintentionally. The method and technology described works when the air region or a region where the attenuation is very light in the projections, which is common in many scans. The computational steps involved are robust and can be performed quickly, in some examples, in real time.

Some embodiments may be used with either spatially-varying background or a static background, and can also be used to correct for data that did not have offset correction. In an example, if external scatter exists, then the offset b term represents the sum of the offset values plus the external scatter. If no external scatter exists, then the offset b represents only the offset values.

The 3D voxelated representation of an object typically comes from a first pass CBCT reconstruction with either no correction, or with some less accurate scatter correction, such as the kernel-based scatter estimation. However, the 3D voxelated representation of the object can alternately come from a CAD model, or a registered reconstruction of a different article of the same object design. These latter possibilities appear to be good candidates for inline inspection.

CBCT reconstruction may be iterated, where the technology described is used to correct a set of projection images, and that is used to make a new reconstruction, which is then used to calculate the material and density images for yet another pass of CBCT reconstruction images. This correction and reconstruction may be repeated an arbitrary number of times, though in some examples sufficient image quality occurs after two passes.

The technology described can be used in conjunction with FDK to reconstruct the data (where FDK is a cone-beam algorithm of Feldkamp, Davis, and Kress—a widely used filtered back projection [or back projection] algorithm for 3D CBCT reconstruction found in L. A. Feldkamp et al, "Practical cone-beam algorithm", J. Opt. Soc. Am. A 1, 612-619, 1984 [https://www.osapublishing.org/DirectPDFAccess/DB95BFA8-FCC7-6A9F-0192BAAB142A6FEF_996/josaa-1-6-612.pdf?da=1&id=996&seq=0&mobile=no]), which is incorporated by reference in its entirety. But the technology described does not rely on any particular algorithm for reconstruction. The technology described can be used with a variety of algorithms including filtered-back projection, back project-filter, Hilbert methods, pi-lines, Katzevich methods, machine learning methods, or various iterative schemes.

Figure 20:
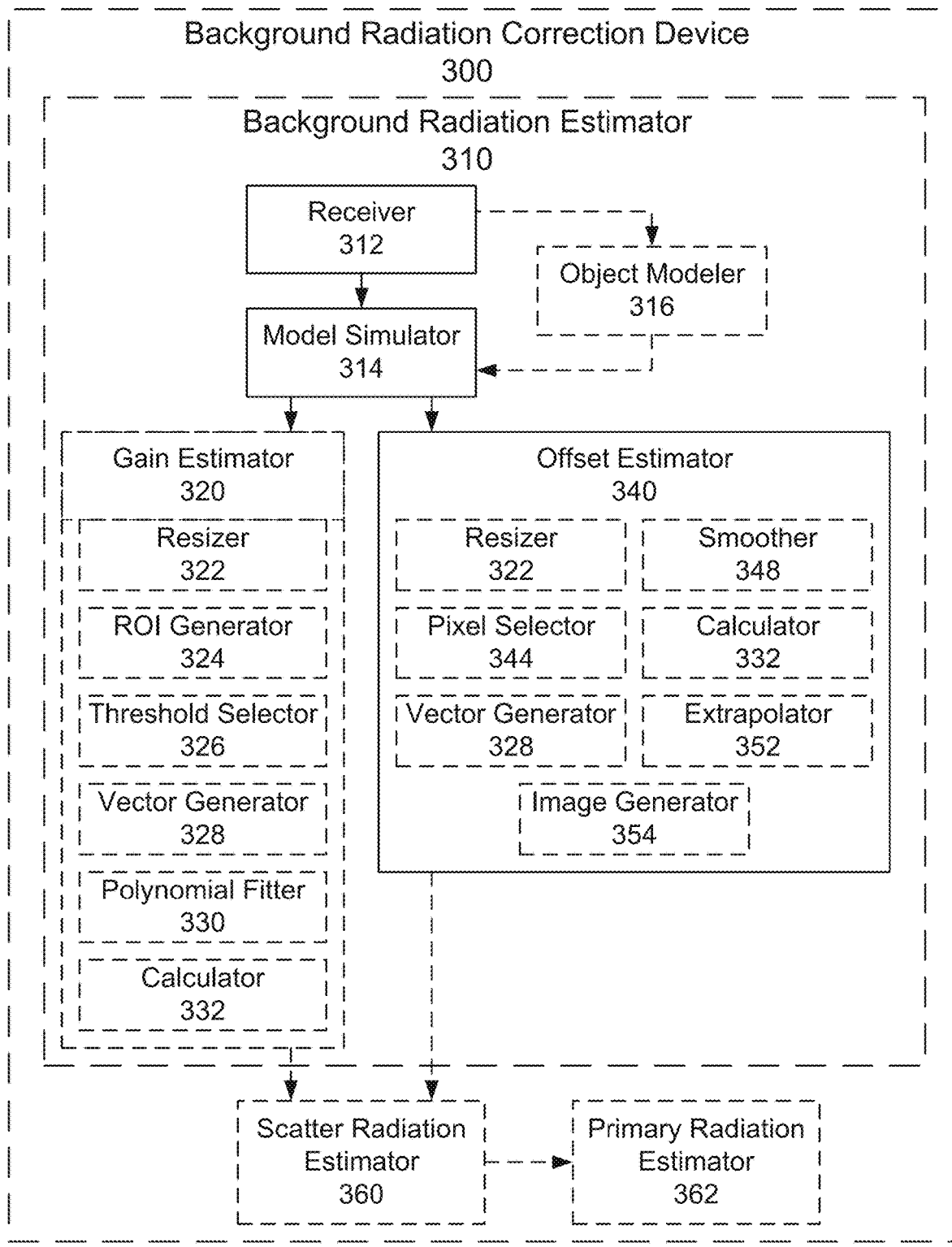
FIG. 20 illustrates a block diagram of an example background radiation estimation and correction device.

FIG. 20 illustrates a block diagram of an example background radiation estimation and correction device. The background estimation radiation estimation and correction device 300 may include a background radiation estimator 310. The background radiation estimator 310 may be configured to generate the gain λ and offset b as described above. The background radiation estimator 310 may include a receiver 312 configured to receive measured radiation $I_m$ as described above. The background radiation estimator 310 may include a model simulator 314 and optionally an object modeler 316. The model simulator 314 may be configured to generate a simulation as described above.

The background radiation estimator 310 may include an offset estimator 340 and a gain estimator 320. The gain estimator 320 and the offset estimator 340 may be configured to generate the gain λ and offset b as described above. For example, the gain estimator 320 may be configured to perform the operations described above with respect to operation 204, operations 204-1 to 204-25 and 204-30 of FIGS. 2B, 3-5, 13, 15, and 19, or the like. The offset estimator 340 may be configured to perform the operations described above with respect to operation 206, 206-1 to 206-7, 206-10, 206-11, 206-20, 206-21, and 206-30 of FIGS. 2A, 2B, 6, 7, 14, 15, and 19, or the like. The gain estimator 320 and the offset estimator 340 may be configured to communicate with each other to implement the iterative processes described above.

The gain estimator 320 may include a resizer 322, a ROI generator 324, a threshold selector 326, a vector generator 328, a polynomial fitter 330, a calculator 322, or the like to perform the operations described above. The offset estimator 340 may include a resizer 322, a pixel selector 344, a vector generator 328, a smoother 348, a calculator 322, an extrapolator 352, an image generator 354, or the like to perform the operations described above. For example, the resizer 322 may be configured to perform operation 204-6 or the like. ROA generator 324 may be configured to perform operations 204-7 or the like. The threshold selector 326 may be configured to select a threshold for operations 204-3, 204-8, 204-11, 204-13, 204-23, 206-1, 206-2, 206-10, 206-20, or the like. The vector generator 328 may be configured generate vectors associated with operations 204-1, 204-3, 204-8, 204-9, 204-11, 206-4, 206-5, 206-6, or the like. The polynomial fitter 330 may be configured to perform operations 204-1, 204-4, 204-10, 204-12, or the like. The calculator 322 may be configured to perform the calculations in the various operations and equations described above.

The background estimation radiation estimation and correction device 300 may include a scatter radiation estimator 360 and a primary radiation estimator 362. The scatter radiation estimator 360 may be configured to perform the operations to generate the scatter radiation $I_s$ as described above. The primary radiation estimator 362 may be configured to generate the primary radiation $I_p$ as described above.

The background estimation radiation estimation and correction device 300 may include a processor such as processor 112, associated memory, a communication interface, or the like to receive data described above, perform the processing described above, and transmit data such as the estimated or corrected primary radiation $I_p$.

The summary provided above is illustrative and is not intended to be in any way limiting. In addition to the examples described above, further aspects, features, and advantages of the invention will be made apparent by reference to the drawings, the following detailed description, and the appended claims.

Some embodiments include a method for estimating background radiation from unknown sources in a tomographic scan, the method comprising: receiving measured radiation ($I_m$) obtained from a radiation detector wherein measured radiation ($I_m$) comprises primary radiation ($I_p$) passing through an object in a field-of-view (FOV) of the radiation detector and scatter radiation ($I_s$) that includes object scatter radiation from the object in the FOV and background scatter radiation from matter outside the FOV; modeling the object from the measured radiation ($I_m$) resulting in a modeled object; simulating radiation transport through the modeled object, resulting in simulated primary radiation ($J_p$) from the modeled object, simulated scatter radiation ($J_s$) from the modeled object, wherein combined simulated radiation ($J_{tot}$) includes the simulated primary radiation ($J_p$) and the simulated scatter radiation ($J_s$) ($J_{tot}=J_p+J_s$); and estimating background scatter radiation (offset or b) from the measured radiation ($I_m$) and the combined simulated radiation ($J_{tot}$).

In some embodiments, the estimate of the background scatter radiation is spatially variant.

In some embodiments, estimating the background scatter radiation (offset or b), further comprises: resizing the measured radiation ($I_m$) into a measured radiation image and resizing the combined simulated radiation ($J_{tot}$) into combined simulated radiation image with similarly sized pixels to the measured radiation image; selecting a pixel with a minimum intensity value in each row of the measured radiation image, wherein each pixel with the minimum intensity value is a minimum pixel; generating a measured column vector ($V_1$) from the minimum pixels of each row; smoothing the measured column vector ($V_1$) to generate a smoothed measured column vector ($V_2$); multiplying the smoothed measured column vector ($V_2$) with a multiplier (A) greater than one to generate a threshold column vector (T(row)=$V_2$(row)*A) with row threshold values; calculating an offset (offset(i,row)) for each pixel in a row (p(i,row)) with an intensity value below a corresponding row threshold value of the row to which the pixel belongs, wherein each pixel offset is equal to a measured pixel value minus a corresponding combined simulated radiation pixel value multiplied by a scaling factor (gain or $\lambda$) (offset(i,row)=$I_m$(i,row)−$\lambda$*$J_{tot}$(i,row)); extrapolating the offset to each pixel in the row with an intensity value above the corresponding row threshold value from the pixel offset calculations; generating an offset image with a similar size to the measured radiation image from the pixel offset calculation and the pixel offset extrapolations; and smoothing the offset image to generate a smoothed offset image, wherein an estimate of the background scatter radiation (offset or b) is the smoothed offset image.

In some embodiments, smoothing the measured column vector ($V_1$) to generate a smoothed measured column vector ($V_2$) uses a box filter, a bilateral filter, a median filter, or another low-pass filter, and smoothing the offset image to generate a smoothed offset image uses a box filter, a bilateral filter, Gaussian filter, low-pass filter, a median filter, splines, or the other low-pass filter.

In some embodiments, extrapolating the offset for each pixel in the row, further comprises: averaging the pixel offset calculations in each row to generate an average row offset for each row; and setting the pixel offset extrapolations to the average row offset for each row.

In some embodiments, the method further comprises setting a lower limit on the offset (offset(i)) for each pixel (p(i)).

In some embodiments, the method further comprises generating a scaling factor (gain or $\lambda$) from the measured radiation ($I_m$) and (divided by) the combined simulated radiation ($J_{tot}$) (or $\lambda$=$I_m$/$J_{tot}$)

In some embodiments, generating the scaling factor (gain or $\lambda$), further comprises: resizing the measured radiation ($I_m$) into a measured radiation image and resizing the combined simulated radiation ($J_{tot}$) into combined simulated radiation image with similarly sized pixels to the measured radiation image; selecting a similar region of interest (ROI) in the measured radiation image and the combined simulated radiation image; and calculating the scaling factor (gain or $\lambda$) for the similarly sized pixels with the similar ROI In some embodiments, the scaling factor (gain or $\lambda$) is a scalar In some embodiments, calculating the scaling factor (gain or $\lambda$) for the similarly sized pixels, further comprises: selecting an inclusion threshold ($T_1$); generating a first measured vector ($Y_1$) from each pixel in the measured radiation image that has a measurement below the inclusion threshold ($T_1$), wherein each pixel in the first measured vector ($Y_1$) that has the measurement below the inclusion threshold ($T_1$) is an included measured pixel; generating a (companion) first simulated vector ($X_1$) from each pixel in the combined simulated radiation image that corresponds to the included measured pixel; polynomial fitting the first measured vector ($Y_1$) to the first simulated vector ($X_1$); computing a relative fitting error for the included measured pixels in the first measured vector; selecting an error threshold ($T_2$); generating a second measured vector ($Y_2$) from each pixel in the first measured vector ($Y_1$) that have a fitting error below the error threshold ($T_2$), wherein each pixel in the second measured vector ($Y_2$) that has the fitting error below the error threshold ($T_2$) is a low-error measured pixel; generating a second simulated vector ($X_2$) from each pixel in the first simulated vector ($X_1$) that corresponds to the low-error measured pixel; polynomial fitting the second measured vector ($Y_2$) to the second simulated vector ($X_2$); and generating the scaling factor (gain or $\lambda$) from the coefficient of a linear term from the polynomial fitting of the second measured vector ($Y_2$) and the second simulated vector ($X_2$)

In some embodiments, calculating the scaling factor (gain or $\lambda$) for the similarly sized pixels, further comprises: calculating for each pixel (p(i)) a gain ratio ($\lambda$(i)) of the measured radiation ($I_m$) over the combined simulated radiation ($J_{tot}$), and averaging the gain ratio ($\lambda$(i)) to generate the scaling factor (gain or $\lambda$); or calculating for each pixel (p(i)) a gain ratio ($\lambda$(i)) of the measured radiation ($I_m$) over the combined simulated radiation ($J_{tot}$), and generating the scaling factor (gain or $\lambda$) from a median gain ratio; or averaging for each pixel (p(i)) the combined simulated radiation ($J_{tot}$) to generate an average combined simulated radiation, averaging for each pixel (p(i)) the measured radiation ($I_m$) to generate an average measured radiation, and calculating the scaling factor (gain or $\lambda$) from a ratio of the average measured radiation over the average combined simulated radiation In some embodiments, the scaling factor (gain or $\lambda$) and the background scatter radiation (offset or b) are each selected from the group consisting of a spatially invariant scalar or a spatially variant matrix In some embodiments, the background scatter radiation (offset or b) is spatially invariant and the scaling factor (gain or $\lambda$) is spatially invariant In some embodiments, generating the scaling factor (gain or $\lambda$) uses at least one high intensity region of the measured radiation ($I_m$), the combined simulated radiation ($J_{tot}$), or the mathematical combination of measured radiation ($I_m$) and the combined simulated radiation ($J_{tot}$); and estimating the background scatter radiation (offset or b) uses at least one low intensity region of the measured radiation ($I_m$), the combined simulated radiation ($J_{tot}$), or the mathematical combination of measured radiation ($I_m$) and the combined simulated radiation ($J_{tot}$)

In some embodiments, at least one high intensity region is used for the gain calculation and at least one low intensity region is used for the offset calculation wherein: the high intensity region consists of pixel locations where the pixel values are in a high percentile of the pixel values from all pixels, wherein optionally, the high percentile is a range between 80% and 100%, and the low intensity region consists of pixel locations where the pixel values are in a low percentile of the pixel values from all pixels, wherein optionally, the low percentile is a range between 0% and 20%, and the pixel values can be the simulated radiation, the measured radiation, or a mathematical combination of the simulated radiation and the measured radiation In some embodiments, the background scatter radiation (offset or b) is spatially variant and the scaling factor (gain or $\lambda$) is spatially variant In some embodiments, a parameter of the modeled object selected from the group consisting of an object density, a linear attenuation coefficient, an object chemical composition, and an object atomic number In some embodiments, simulating the radiation transport through the modeled object and the scatter radiation from the object includes using a kernel-based scatter estimator, a (linear) Boltzmann equation solver (LBES), other finite element deterministic photon transport solver, or a Monte Carlo simulator In some embodiments, an estimate of the scatter radiation ($I_s$) is the scaling factor (gain or $\lambda$) multiplied by the simulated scatter radiation ($J_s$) plus the estimate of the background scatter radiation (offset or b) (or $I_s=\lambda J_s+b$)

Some embodiments include a method for correcting the tomographic scan with background radiation from unknown sources, the method comprising: generating the scaling factor (gain or $\lambda$) and estimating the background scatter radiation (offset or b) as described above; estimating the scatter radiation ($I_s$) from the scaling factor (gain or $\lambda$) multiplied by the simulated scatter radiation ($J_s$) plus the estimate of the background scatter radiation (offset or b) (or $I_s=\lambda J_s+b$); estimating the primary radiation ($I_p$) by subtracting the estimate of the scatter radiation ($I_s$) from the measured radiation ($I_m$)

Some embodiments include a method for correcting the tomographic scan with background radiation from unknown sources, the method comprising: receiving measured radiation ($I_m$) from a radiation detector, wherein the measured radiation ($I_m$) comprises primary radiation ($I_p$) passing through an object in a field-of-view (FOV) of the radiation detector and scatter radiation ($I_s$) that includes object scatter radiation from the object in the FOV and background scatter radiation from matter outside the FOV ($I_m=I_p+I_s$); receiving combined simulated radiation ($J_{tot}$) from a radiation simulator that generated a model object from the measured radiation ($I_m$), wherein combined simulated radiation ($J_{tot}$) includes simulated primary radiation ($J_p$) from the modeled object and the simulated simulated scatter radiation ($J_s$) from the modeled object ($J_{tot}=J_p+J_s$); generating a scaling factor (gain or $\lambda$); estimating background scatter radiation (offset or b); estimating the scatter radiation ($I_s$) from the scaling factor (gain or $\lambda$) multiplied by the simulated scatter radiation ($J_s$) plus the estimate of the background scatter radiation (offset or b) (or $I_s=\lambda J_s+b$); estimating the primary radiation ($I_p$) by subtracting the estimate of the scatter radiation ($I_s$) from the measured radiation ($I_m$)

In some embodiments, the method further comprises rendering the estimate of the primary radiation ($I_p$); or wherein estimating the primary radiation ($I_p$) performs simple subtraction of the estimate of the scatter radiation ($I_s$) from the measured radiation ($I_m$) (or $I_p=I_m-I_s$); or wherein estimating the primary radiation ($I_p$) performs smoothed subtraction ($I_p=I_m$ (1-smooth ($I_s/I_m$))

Some embodiments include a method for estimating background radiation from unknown sources in a tomographic scan, the method comprising: measuring radiation using a radiation detector wherein measured radiation ($I_m$) comprises primary radiation ($I_p$) passing through an object in a field-of-view (FOV) of the radiation detector and scatter radiation ($I_s$) that includes object scatter radiation from the object in the FOV and background scatter radiation from matter outside the FOV; modeling the object from the measured radiation ($I_m$) resulting in a modeled object; simulating the radiation transport through the modeled object, resulting in simulated primary radiation ($J_p$) from the modeled object, simulated scatter radiation ($J_s$) from the modeled object, wherein combined simulated radiation ($J_{tot}$) includes the simulated primary radiation ($J_p$) and the simulated scatter radiation ($J_s$) ($J_{tot}=J_p+J_s$); and estimating background scatter radiation (offset or b) from the measured radiation ($I_m$) and the combined simulated radiation ($J_{tot}$)

Some embodiments include method for estimating background radiation from unknown sources in a tomographic scan, the method comprising: receiving measured radiation ($I_m$) obtained from a radiation detector wherein measured radiation ($I_m$) comprises primary radiation ($I_p$) passing through an object in a field-of-view (FOV) of the radiation detector and scatter radiation ($I_s$) that includes object scatter radiation from the object in the FOV and background scatter radiation from matter outside the FOV; receiving combined simulated radiation ($J_{tot}$) of a modeled object based on the measured radiation ($I_m$) of the object, wherein the combined simulated radiation ($J_{tot}$) includes the simulated primary radiation ($J_p$) and the simulated scatter radiation ($J_s$) ($J_{tot}=J_p+J_s$); and estimating background scatter radiation (offset or b) from the measured radiation ($I_m$) and the combined simulated radiation ($J_{tot}$)

Some embodiments include at least one non-transitory machine-readable storage medium comprising a plurality of instructions adapted to be executed to implement the methods described herein.

Some embodiments include a background radiation estimator 310, comprising: a receiver 312 for obtaining measured radiation ($I_m$) from a radiation detector, wherein the measured radiation ($I_m$) comprises primary radiation ($I_p$) passing through an object in a field-of-view (FOV) of the radiation detector and scatter radiation ($I_s$) that includes object scatter radiation from the object in the FOV and background scatter radiation from matter outside the FOV; a model simulator 314 for simulating radiation transport through a modeled object based on the measured radiation ($I_m$) of the object, resulting in simulated primary radiation ($J_p$) from the modeled object, simulated scatter radiation ($J_s$) from the modeled object, wherein combined simulated radiation ($J_{tot}$) that includes the simulated primary radiation ($J_p$) and the simulated scatter radiation ($J_s$) ($J_{tot}=J_p+J_s$); and an offset estimator 340 for estimating background scatter radiation (offset or b) from the measured radiation ($I_m$) and the combined simulated radiation ($J_{tot}$)

In some embodiments, the offset estimator 340 further comprises: a resizer 322 configured to resize the measured radiation ($I_m$) into a measured radiation image and resizing the combined simulated radiation ($J_{tot}$) into combined simulated radiation image with similarly sized pixels to the measured radiation image; or a pixel selector 344 configured to select a pixel with a minimum intensity value in each row of the measured radiation image, wherein each pixel with the minimum intensity value is a minimum pixel; a vector generator 328 configured to generate a measured column vector ($V_1$) from the minimum pixels of each row; a smoother 348 configured to smooth the measured column vector ($V_1$) to generate a smoothed measured column vector ($V_2$), and configured to smooth an offset image to generate a smoothed offset image, wherein an estimate of the background scatter radiation (offset or b) is the smoothed offset image; a calculator/processor 332 configured to multiply the smoothed measured column vector ($V_2$) with a multiplier (A) greater than one to generate a threshold column vector ($T(row)=V_2(row)*A$) with row threshold values, and configured to calculate an offset (offset(i,row)) for each pixel in a row (p(i,row)) with an intensity value below a corresponding row threshold value of the row to which the pixel belongs, wherein each pixel offset is equal to a measured pixel value minus a corresponding combined simulated radiation pixel value multiplied by a scaling factor (gain or $\lambda$) (offset(i,row)=$I_m$(i,row)$-\lambda*J_{tot}$(i,row)); an extrapolator 352 configured to extrapolate the offset to each pixel in the row with an intensity value above the corresponding row threshold value from the pixel offset calculations; and an imaging generator 354 configured to generate an offset image with a similar size to the measured radiation image from the pixel offset calculation and the pixel offset extrapolations In some embodiments, the background radiation estimator 310 further comprises a gain estimator 320 configured to generate a scaling factor (gain or λ) from the measured radiation ($I_m$) and the combined simulated radiation ($J_{tot}$)

In some embodiments, the gain estimator 320 further comprises: a resizer 322 configured to resize the measured radiation ($I_m$) into a measured radiation image and resizing the combined simulated radiation ($J_{tot}$) into combined simulated radiation image with similarly sized pixels to the measured radiation image; a region of interest (ROI) generator 324 configured to select a similar region of interest (ROI) in the measured radiation image and the combined simulated radiation image; a threshold selector 326 configured to select an inclusion threshold ($T_1$), and configured to select an error threshold ($T_2$); a vector generator 328 configured to generate a first measured vector ($Y_1$) from each pixel in the measured radiation image that has a measurement below the inclusion threshold ($T_1$), wherein each pixel in the first measured vector ($Y_1$) that has the measurement below the inclusion threshold ($T_1$) is an included measured pixel, and configured to generate a (companion) first simulated vector ($X_1$) from each pixel in the combined simulated radiation image that corresponds to the included measured pixel; a polynomial fitter 330 configured to polynomial fit the first measured vector ($Y_1$) to the first simulated vector ($X_1$) and polynomial fitting the second measured vector ($Y_2$) to the second simulated vector ($X_2$); the calculator/processor 332 configured to compute a relative fitting error for the included measured pixels in the first measured vector; and wherein the vector generator 328 is further configured to generate a second measured vector ($Y_2$) from each pixel in the first measured vector ($Y_1$) that have a fitting error below the error threshold ($T_2$), wherein each pixel in the second measured vector ($Y_2$) that has the fitting error below the error threshold ($T_2$) is a low-error measured pixel, and further configured to generate a second simulated vector ($X_2$) from each pixel in the first simulated vector ($X_1$) that corresponds to the low-error measured pixel; and wherein the calculator/processor 332 is further configured to generate the scaling factor (gain or λ) from the coefficient of a linear term from the polynomial fitting of the second measured vector ($Y_2$) and the second simulated vector ($X_2$)

In some embodiments, the background radiation estimator 310 further comprises a scatter radiation estimator 360 configured to estimate the scatter radiation ($I_s$) from a scaling factor (gain or λ) multiplied by the simulated scatter radiation ($J_s$) plus the estimate of the background scatter radiation (offset or b) (or $I_s = \lambda J_s + b$); and a primary radiation estimator 362 configured to estimate the primary radiation ($I_p$) by subtracting the estimate of the scatter radiation ($I_s$) from the measured radiation ($I_m$)

Some embodiments include a background radiation estimator for estimating background radiation from unknown sources in a tomographic scan, comprising: measured radiation receiving means for obtaining measured radiation ($I_m$) from a radiation detector, wherein the measured radiation ($I_m$) comprises primary radiation ($I_p$) passing through an object in a field-of-view (FOV) of the radiation detector and scatter radiation ($I_s$) that includes object scatter radiation from the object in the FOV and background scatter radiation from matter outside the FOV; model simulation means for simulating radiation transport through a modeled object based on the measured radiation ($I_m$) of the object, resulting in simulated primary radiation ($J_p$) from the modeled object, simulated scatter radiation ($J_s d$) from the modeled object, wherein combined simulated radiation ($J_{tot}$) that includes the simulated primary radiation ($J_p$) and the simulated scatter radiation ($J_s$) ($J_{tot} = J_p + J_s$); and offset estimating means for estimating background scatter radiation (offset or b) from the measured radiation ($I_m$) and the combined simulated radiation ($J_{tot}$)

In some embodiments, the background radiation estimator further comprises an object modeling means for generating a modeled object from the measured radiation ($I_m$); or a gain estimating means for generating a scaling factor (gain or λ) from the measured radiation ($I_m$) and the combined simulated radiation ($J_{tot}$)

In some embodiments, the background radiation estimator further comprises a resizing means for resizing the measured radiation ($I_m$) into a measured radiation image and resizing the combined simulated radiation ($J_{tot}$) into combined simulated radiation image with similarly sized pixels to the measured radiation image; or a pixel selection means for selecting a pixel with a minimum intensity value in each row of the measured radiation image, wherein each pixel with the minimum intensity value is a minimum pixel; or a vector generation means for generating a measured column vector ($V_1$) from the minimum pixels of each row; or a smoothing means for smoothing the measured column vector ($V_1$) to generate a smoothed measured column vector ($V_2$), and smoothing an offset image to generate a smoothed offset image, wherein an estimate of the background scatter radiation (offset or b) is the smoothed offset image; or a calculating/processing means for multiplying the smoothed measured column vector ($V_2$) with a multiplier (A) greater than one to generate a threshold column vector (T(row)=$V_2$(row) *A) with row threshold values, and calculating an offset (offset(i,row)) for each pixel in a row (p(i,row)) with an intensity value below a corresponding row threshold value of the row to which the pixel belongs, wherein each pixel offset is equal to a measured pixel value minus a corresponding combined simulated radiation pixel value multiplied by a scaling factor (gain or λ) (offset(i,row)=$I_m$(i,row)−λ*$J_{tot}$(i,row)); or an extrapolating means for extrapolating the offset to each pixel in the row with an intensity value above the corresponding row threshold value from the pixel offset calculations; or an imaging generating means for generating an offset image with a similar size to the measured radiation image from the pixel offset calculation and the pixel offset extrapolations; or a threshold selection means for selecting an inclusion threshold ($T_1$), and selecting an error threshold ($T_2$); or the vector generation means for generating a first measured vector ($Y_1$) from each pixel in the measured radiation image that has a measurement below the inclusion threshold ($T_1$), wherein each pixel in the first measured vector ($Y_1$) that has the measurement below the inclusion threshold ($T_1$) is an included measured pixel, and generating a (companion) first simulated vector ($X_1$) from each pixel in the combined simulated radiation image that corresponds to the included measured pixel; or a polynomial fitting means for polynomial fitting the first measured vector ($Y_1$) to the first simulated vector ($X_1$) and polynomial fitting the second measured vector ($Y_2$) to the second simulated vector ($X_2$); or the calculating/processing means for computing a relative fitting error for the included measured pixels in the first measured vector; or the vector generation means for generating a second measured vector ($Y_2$) from each pixel in the first measured vector ($Y_1$) that have a fitting error below the error threshold ($T_2$), wherein each pixel in the second measured vector ($Y_2$) that has the fitting error below the error threshold ($T_2$) is a low-error measured pixel, and generating a second simulated vector ($X_2$) from each pixel in the first simulated vector ($X_1$) that corresponds to the low-error measured pixel; or the gain estimating means for generating the scaling factor (gain or λ) from the coefficient of a linear term from the polynomial fitting of the second measured vector ($Y_2$) and the second simulated vector ($X_2$)

Some embodiments include the background radiation correction device for correcting the tomographic scan with background radiation from unknown sources, comprising: the background radiation estimator as described above; a scatter radiation estimating means for estimating the scatter radiation ($I_s$) from a scaling factor (gain or λ) multiplied by the simulated scatter radiation ($J_s$) plus the estimate of the background scatter radiation (offset or b) (or $I_s=\lambda J_s+b$); and a primary radiation estimating means for estimating the primary radiation ($I_p$) by subtracting the estimate of the scatter radiation ($I_s$) from the measured radiation ($I_m$). Some embodiments include a method, comprising: receiving measured radiation obtained from a radiation detector that received radiation through an object 200; simulating the measured radiation obtained from the radiation detector that received radiation through the object 202; generating an offset based on the measured radiation and the simulated measured radiation 206; estimating scatter radiation based on the offset 208, 208'; and estimating primary radiation based on the estimated scatter radiation 210.

In some embodiments, the method further comprises generating a gain based on the measured radiation and the simulated measured radiation 204; wherein estimating the scatter radiation further comprises estimating the scatter radiation based on the gain and the offset 208'.

In some embodiments, the method further comprises generating the estimated scatter radiation based on the gain, the offset, and a simulated scatter radiation component of the simulated measured radiation; and generating the estimated primary radiation based on the estimated scatter radiation and the measured radiation.

In some embodiments, the method further comprises fitting a polynomial to a first vector of pixel values of the measured radiation versus a second vector of pixel values of the simulated measured radiation 204-1; and generating the gain based on the polynomial 204-2.

In some embodiments, the gain is a linear term of the polynomial.

In some embodiments, the polynomial is at least a second order polynomial.

In some embodiments, the method further comprises fitting a first polynomial to a first vector of pixel values of the measured radiation versus a second vector of pixel values of the simulated measured radiation 204-1; reducing a size of the first vector and a size of the second vector to remove pixel values having an error of the first polynomial greater than a threshold 204-3; fitting a second polynomial to the reduced first vector versus the reduced second vector 204-4; and generating the gain based on the second polynomial 204-5.

In some embodiments, the method further comprises resizing the measured radiation and/or the simulated measured radiation such that the measured radiation and the simulated measured radiation have the same resolution 204-6; determining a region of interest of the measured radiation 204-7; generating a first vector of pixel values of the measured radiation in the region of interest having a value less than a first threshold 204-8; generating a second vector of pixel values of the simulated measured radiation corresponding to the first vector 204-9; fitting a first polynomial to the first vector versus the second vector 204-10; removing pixel values from the first vector and the second vector where a relative error of the first polynomial is greater than a second threshold 204-11; fitting a second polynomial to the remaining pixel values of the first vector versus the second vector 204-12; wherein the gain comprises a linear term of the second polynomial; generating a third vector including a minimum from each of a plurality of subregions of the measured radiation 206-4; smoothing the third vector to generate a fourth vector 206-5; scaling the fourth vector by a value greater than 1 to generate a fifth vector 206-6; and generating an offset matrix as the offset where, for each pixel of each subregion of the measured radiation: if a value of the pixel is below the value of the fifth vector associated with the subregion, a value of the corresponding pixel of the offset matrix is the difference of the pixel value of the measured radiation and pixel value of the corresponding pixel of the simulated measured radiation scaled by the gain; and for other pixels, generating a value of the corresponding pixel of the offset matrix based on other pixels of the offset matrix of the subregion 206-7.

In some embodiments, the method further comprises selecting pixels of the measured radiation and the simulated measured radiation where each pixel value tuple has a Euclidean magnitude above a threshold 204-13; generating an intermediate gain based on the selected pixels 204-14; and generating the gain based on the offset and the second intermediate gain 204-15.

In some embodiments, the method further comprises generating a first intermediate gain based on a maximum of the measured radiation and a maximum of the simulated measured radiation 204-20; normalizing the simulated measured radiation to the measured radiation with the first intermediate gain 204-21; calculating a Euclidian magnitude of the normalized simulated measured radiation and measured radiation for each pixel 204-22; selecting first pixels of the measured radiation and the simulated measured radiation corresponding to pixels of the normalized simulated measured radiation and measured radiation having a Euclidian magnitude above a first threshold 204-23; generating a second intermediate gain based on the selected first pixels of the measured radiation and the simulated measured radiation 204-24; selecting second pixels of the measured radiation and the simulated measured radiation corresponding to pixels of the normalized simulated measured radiation and measured radiation having a magnitude below a second threshold 206-20; generating the offset based on the selected second pixels of the measured radiation and the simulated measured radiation 206-21; and generating the gain based on the offset and the second intermediate gain 204-25.

In some embodiments, the method further comprises generating an intermediate gain matrix including an intermediate gain for each of a plurality of subregions of the measured radiation 204-30; and generating the offset for each of the subregions based on the associated intermediate gain 206-30.

In some embodiments, for each of a plurality of subregions of the measured radiation: generating a threshold based on a minimum of the subregion 206-1; generating a pixel offset for each pixel in the subregion with a value lower than the threshold 206-2; and combining the pixel offsets of the pixels in the subregion with the value lower than the threshold into a default offset for pixels in the subregion with a value greater than the threshold 206-3; wherein the offset is an offset image including the pixel offsets of the pixels in the subregion with the value lower than the threshold and the default offset.

In some embodiments, the method further comprises selecting pixels of the measured radiation and the simulated measured radiation where each pixel value tuple has a Euclidean magnitude below a threshold 206-10; and generating the offset based on the selected pixels 206-11.

Some embodiments include a system, comprising: a communication interface; a memory; and a processor configured to: receive measured radiation obtained from a radiation detector that received radiation through an object; simulate the measured radiation obtained from the radiation detector that received radiation through the object; generate an offset based on the measured radiation and the simulated measured radiation; estimate scatter radiation based on the offset; and estimate primary radiation based on the estimated scatter radiation.

In some embodiments, the processor is further configured to: fit a first polynomial to a first vector of pixel values of the measured radiation versus a second vector of pixel values of the simulated measured radiation; reduce a size of the first vector and a size of the second vector to remove pixel values having an error of the first polynomial greater than a threshold; fit a second polynomial to the reduced first vector versus the reduced second vector; generate a gain based on the second polynomial; and estimate the scatter radiation based on the gain and the offset.

In some embodiments, the processor is further configured to: select pixels of the measured radiation and the simulated measured radiation where each pixel value tuple has a Euclidean magnitude above a threshold; generate an intermediate gain based on the selected pixels; generate a gain based on the offset and the second intermediate gain; and estimate the scatter radiation based on the gain and the offset.

In some embodiments, the processor is further configured to: generate a threshold based on a minimum of the subregion; generate a pixel offset for each pixel in the subregion with a value lower than the threshold; and combine the pixel offsets of the pixels in the subregion with the value lower than the threshold into a default offset for pixels in the subregion with a value greater than the threshold; wherein the offset is an offset image including the pixel offsets of the pixels in the subregion with the value lower than the threshold and the default offset.

In some embodiments, the processor is further configured to: select pixels of the measured radiation and the simulated measured radiation where each pixel value tuple has a Euclidean magnitude below a threshold; and generate the offset based on the selected pixels.

Some embodiments include a system, comprising: means for receiving measured radiation obtained from a radiation detector that received radiation through an object; means for simulating the measured radiation obtained from the radiation detector that received radiation through the object; means for generating an offset based on the measured radiation and the simulated measured radiation; means for estimating scatter radiation based on the offset; and means for estimating primary radiation based on the estimated scatter radiation.

In some embodiments, the system further comprises means for generating a gain based on the measured radiation and the simulated measured radiation wherein the means for estimating scatter radiation comprise means for estimating scatter radiation based on the gain; means for generating a measured scatter radiation based on the gain, the offset, and a simulated scatter radiation component of the simulated measured radiation; and means for generating a measured un-scattered radiation based on the measured scatter radiation and the measured radiation.

Some embodiments include a non-transitory computer readable medium including instructions that, when executed by the computer, cause the computer to perform the operations described herein. Circuitry can include hardware, firmware, program code, executable code, computer instructions, and/or software. A non-transitory computer readable storage medium can be a computer readable storage medium that does not include a signal.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, including but not limited to logic chips, transistors, or other components. A module may also be implemented in programmable hardware devices, including but not limited to field programmable gate arrays (FPGA), programmable array logic, programmable logic devices or similar devices.

Reference throughout this specification to an "example" or an "embodiment" means that a particular feature, structure, or characteristic described in connection with the example is included in at least one embodiment of the invention. Thus, appearances of the words an "example" or an "embodiment" in various places throughout this specification are not necessarily all referring to the same embodiment.

Furthermore, the described features, structures, or characteristics may be combined in a suitable manner in one or more embodiments. In the following description, numerous specific details are provided (e.g., examples of layouts and designs) to provide a thorough understanding of embodiments of the invention. One skilled in the relevant art will recognize, however, that the invention can be practiced without one or more of the specific details, or with other methods, components, layouts, etc. In other instances, well-known structures, components, or operations are not shown or described in detail to avoid obscuring aspects of the invention.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claims 1, 3, or 4, with these separate dependencies yielding three distinct embodiments; claim 6 can depend from any one of claims 1, 3, 4, or 5, with these separate dependencies yielding four distinct embodiments; and so on.

Recitation in the claims of the term "first" with respect to a feature or element does not necessarily imply the existence of a second or additional such feature or element.

Elements specifically recited in means-plus-function format, if any, are intended to be construed to cover the corresponding structure, material, or acts described herein and equivalents thereof in accordance with 35 U.S.C. §

112(f). Embodiments of the invention in which an exclusive property or privilege is claimed are defined as follows.

What is claimed is:

1. A method, comprising:
receiving measured radiation obtained from a radiation detector that received radiation through an object;
simulating the measured radiation obtained from the radiation detector that received radiation through the object;
generating an offset based on the measured radiation and the simulated measured radiation;
estimating scatter radiation based on the offset; and
estimating primary radiation based on the estimated scatter radiation.

2. The method of claim 1, further comprising:
generating a gain based on the measured radiation and the simulated measured radiation;
wherein estimating the scatter radiation further comprises estimating the scatter radiation based on the gain and the offset.

3. The method of claim 2, further comprising:
generating the estimated scatter radiation based on the gain, the offset, and a simulated scatter radiation component of the simulated measured radiation; and
generating the estimated primary radiation based on the estimated scatter radiation and the measured radiation.

4. The method of claim 2, further comprising:
fitting a polynomial to a first vector of pixel values of the measured radiation versus a second vector of pixel values of the simulated measured radiation; and
generating the gain based on the polynomial.

5. The method of claim 4, wherein:
the gain is a linear term of the polynomial.

6. The method of claim 5, wherein:
the polynomial is at least a second order polynomial.

7. The method of claim 2, further comprising:
fitting a first polynomial to a first vector of pixel values of the measured radiation versus a second vector of pixel values of the simulated measured radiation;
reducing a size of the first vector and a size of the second vector to remove pixel values having an error of the first polynomial greater than a threshold;
fitting a second polynomial to the reduced first vector versus the reduced second vector; and
generating the gain based on the second polynomial.

8. The method of claim 2, further comprising:
resizing the measured radiation and/or the simulated measured radiation such that the measured radiation and the simulated measured radiation have the same resolution;
determining a region of interest of the measured radiation;
generating a first vector of pixel values of the measured radiation in the region of interest having a value less than a first threshold;
generating a second vector of pixel values of the simulated measured radiation corresponding to the first vector;
fitting a first polynomial to the first vector versus the second vector;
removing pixel values from the first vector and the second vector where a relative error of the first polynomial is greater than a second threshold;
fitting a second polynomial to the remaining pixel values of the first vector versus the second vector;
wherein the gain comprises a linear term of the second polynomial;
generating a third vector including a minimum from each of a plurality of subregions of the measured radiation;
smoothing the third vector to generate a fourth vector;
scaling the fourth vector by a value greater than 1 to generate a fifth vector; and
generating an offset matrix as the offset where, for each pixel of each subregion of the measured radiation:
if a value of the pixel is below the value of the fifth vector associated with the subregion, a value of the corresponding pixel of the offset matrix is the difference of the pixel value of the measured radiation and pixel value of the corresponding pixel of the simulated measured radiation scaled by the gain; and
for other pixels, generating a value of the corresponding pixel of the offset matrix based on other pixels of the offset matrix of the subregion.

9. The method of claim 2, further comprising:
selecting pixels of the measured radiation and the simulated measured radiation where each pixel value tuple has a Euclidean magnitude above a threshold;
generating an intermediate gain based on the selected pixels; and
generating the gain based on the offset and the second intermediate gain.

10. The method of claim 2, further comprising:
generating a first intermediate gain based on a maximum of the measured radiation and a maximum of the simulated measured radiation;
normalizing the simulated measured radiation to the measured radiation with the first intermediate gain;
calculating a Euclidian magnitude of the normalized simulated measured radiation and measured radiation for each pixel;
selecting first pixels of the measured radiation and the simulated measured radiation corresponding to pixels of the normalized simulated measured radiation and measured radiation having a Euclidian magnitude above a first threshold;
generating a second intermediate gain based on the selected first pixels of the measured radiation and the simulated measured radiation;
selecting second pixels of the measured radiation and the simulated measured radiation corresponding to pixels of the normalized simulated measured radiation and measured radiation having a magnitude below a second threshold;
generating the offset based on the selected second pixels of the measured radiation and the simulated measured radiation; and
generating the gain based on the offset and the second intermediate gain.

11. The method of claim 2, further comprising:
generating an intermediate gain matrix including an intermediate gain for each of a plurality of subregions of the measured radiation; and
generating the offset for each of the subregions based on the associated intermediate gain.

12. The method of claim 1, wherein, for each of a plurality of subregions of the measured radiation:
generating a threshold based on a minimum of the subregion;
generating a pixel offset for each pixel in the subregion with a value lower than the threshold; and
combining the pixel offsets of the pixels in the subregion with the value lower than the threshold into a default offset for pixels in the subregion with a value greater than the threshold;

wherein the offset is an offset image including the pixel offsets of the pixels in the subregion with the value lower than the threshold and the default offset.

13. The method of claim 1, further comprising:
selecting pixels of the measured radiation and the simulated measured radiation where each pixel value tuple has a Euclidean magnitude below a threshold; and
generating the offset based on the selected pixels.

14. A system, comprising:
a communication interface;
a memory; and
a processor configured to:
receive measured radiation obtained from a radiation detector that received radiation through an object;
simulate the measured radiation obtained from the radiation detector that received radiation through the object;
generate an offset based on the measured radiation and the simulated measured radiation;
estimate scatter radiation based on the offset; and
estimate primary radiation based on the estimated scatter radiation.

15. The system of claim 14, wherein the processor is further configured to:
fit a first polynomial to a first vector of pixel values of the measured radiation versus a second vector of pixel values of the simulated measured radiation;
reduce a size of the first vector and a size of the second vector to remove pixel values having an error of the first polynomial greater than a threshold;
fit a second polynomial to the reduced first vector versus the reduced second vector;
generate a gain based on the second polynomial; and
estimate the scatter radiation based on the gain and the offset.

16. The system of claim 14, wherein the processor is further configured to:
select pixels of the measured radiation and the simulated measured radiation where each pixel value tuple has a Euclidean magnitude above a threshold;
generate an intermediate gain based on the selected pixels;
generate a gain based on the offset and the second intermediate gain; and
estimate the scatter radiation based on the gain and the offset.

17. The system of claim 14, wherein the processor is further configured to:
generate a threshold based on a minimum of the subregion;
generate a pixel offset for each pixel in the subregion with a value lower than the threshold; and
combine the pixel offsets of the pixels in the subregion with the value lower than the threshold into a default offset for pixels in the subregion with a value greater than the threshold;
wherein the offset is an offset image including the pixel offsets of the pixels in the subregion with the value lower than the threshold and the default offset.

18. The system of claim 14, wherein the processor is further configured to:
select pixels of the measured radiation and the simulated measured radiation where each pixel value tuple has a Euclidean magnitude below a threshold; and
generate the offset based on the selected pixels.

19. A system, comprising:
means for receiving measured radiation obtained from a radiation detector that received radiation through an object;
means for simulating the measured radiation obtained from the radiation detector that received radiation through the object;
means for generating an offset based on the measured radiation and the simulated measured radiation;
means for estimating scatter radiation based on the offset; and
means for estimating primary radiation based on the estimated scatter radiation.

20. The system of claim 19, further comprising:
means for generating a gain based on the measured radiation and the simulated measured radiation wherein the means for estimating scatter radiation comprise means for estimating scatter radiation based on the gain;
means for generating a measured scatter radiation based on the gain, the offset, and a simulated scatter radiation component of the simulated measured radiation; and
means for generating a measured un-scattered radiation based on the measured scatter radiation and the measured radiation.

* * * * *